US012647923B2

(12) United States Patent
Wu

(10) Patent No.: US 12,647,923 B2
(45) Date of Patent: Jun. 2, 2026

(54) MANAGING USER EQUIPMENT CAPABILITIES IN SINGLE AND MULTIPLE REGISTRATION SCENARIOS

(71) Applicant: GOOGLE LLC, Mountain View, CA (US)

(72) Inventor: Chih-Hsiang Wu, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 272 days.

(21) Appl. No.: 18/550,952

(22) PCT Filed: Mar. 10, 2022

(86) PCT No.: PCT/US2022/019675
§ 371 (c)(1),
(2) Date: Sep. 15, 2023

(87) PCT Pub. No.: WO2022/197515
PCT Pub. Date: Sep. 22, 2022

(65) Prior Publication Data
US 2024/0147402 A1 May 2, 2024

Related U.S. Application Data

(60) Provisional application No. 63/200,569, filed on Mar. 15, 2021.

(51) Int. Cl.
*H04W 60/00* (2009.01)
*H04W 88/06* (2009.01)

(52) U.S. Cl.
CPC .......... *H04W 60/005* (2013.01); *H04W 88/06* (2013.01)

(58) Field of Classification Search
CPC ..... H04W 60/005; H04W 88/06; H04W 8/24; H04W 8/183
See application file for complete search history.

(56) References Cited

U.S. PATENT DOCUMENTS 10,313,963 B2 * 6/2019 Dandra ................. H04W 48/18
2016/0119824 A1 4/2016 Jin et al.
(Continued)

FOREIGN PATENT DOCUMENTS

AU 2017269344 B2 * 7/2021 ......... H04L 63/0853
CN 102388661 A * 3/2012 ........ H04W 36/0033
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP Draft (Mar. 30, 2016).
(Continued)

*Primary Examiner* — Julio R Perez
(74) *Attorney, Agent, or Firm* — MARSHALL, GERSTEIN & BORUN LLP

(57) ABSTRACT

A user equipment (UE) can implement a method for managing UE capability information. The method includes: registering (1702) with a first cellular network via a first RAN using a first universal subscriber identity module (USIM); registering (1704) with a second cellular network via a second RAN using a second USIM; transmitting (1706), to the first RAN, a first indication of a UE capability for communicating with the first RAN over a first RAT; and based on whether the UE supports communicating over a second RAT, which is different from the first RAT, while registered to both the first cellular network and the second cellular network, either: (i) transmitting (1710), to the first RAN, a second indication of a UE capability for communicating with the first RAN over the second RAT; or (ii) disabling (1712) UE capabilities dedicated to communicating over the second RAT.

20 Claims, 18 Drawing Sheets

(56) References Cited

U.S. PATENT DOCUMENTS

| | | | | |
|---|---|---|---|---|
| 2017/0289019 A1* | 10/2017 | Faccin | ................ | H04L 61/5007 |
| 2018/0049213 A1 | 2/2018 | Gholmieh et al. | | |
| 2019/0357037 A1* | 11/2019 | Velev | ................... | H04W 76/27 |
| 2020/0053545 A1 | 2/2020 | Wong et al. | | |
| 2021/0051748 A1 | 2/2021 | Xu et al. | | |

FOREIGN PATENT DOCUMENTS

| | | | | | |
|---|---|---|---|---|---|
| CN | 111034261 A | * | 4/2020 | ........ | H04W 36/0061 |
| EP | 2262319 A1 | * | 12/2010 | ............ | H04W 8/245 |
| EP | 3635917 B1 | * | 1/2025 | .......... | H04W 88/184 |
| GB | 2491869 A | * | 12/2012 | ............ | H04W 88/06 |
| KR | 101527637 B1 | * | 6/2015 | ............ | H04W 88/06 |
| WO | WO-2013174256 A1 | * | 11/2013 | ............ | H04W 48/18 |
| WO | WO-2016028560 A1 | * | 2/2016 | ............ | H04W 48/18 |
| WO | WO-2020/247043 A1 | | 12/2020 | | |
| WO | WO-2020/251815 A1 | | 12/2020 | | |
| WO | WO-2021/002268 A1 | | 1/2021 | | |
| WO | WO-2021/020190 A1 | | 2/2021 | | |
| WO | WO-2022233903 A1 | * | 11/2022 | ............ | H04W 76/27 |

OTHER PUBLICATIONS

Intel Corporation, "UE Capability for Rel-16 NR Mobility Enhancement," 3GPP Draft (Jun. 2020).

International Search Report and Written Opinion for Application No. PCT/US2022/019675, dated Jun. 24, 2022.

"System architecture for the 5G System (5GS)," 3GPP TS 23.501 version 16.7.0 Release (2021).

ITRI, "UE Capabilities Issues for tight interworking between NR and LTE," 3GPP TSG-RAN WG2 Meeting#94 (2016).

Vivo, "Revised WID: Core part: Support for Multi-SIM devices for LTE/NR," 3GPP TSG RAN Meeting #90e (2020).

* cited by examiner

700 ⤹

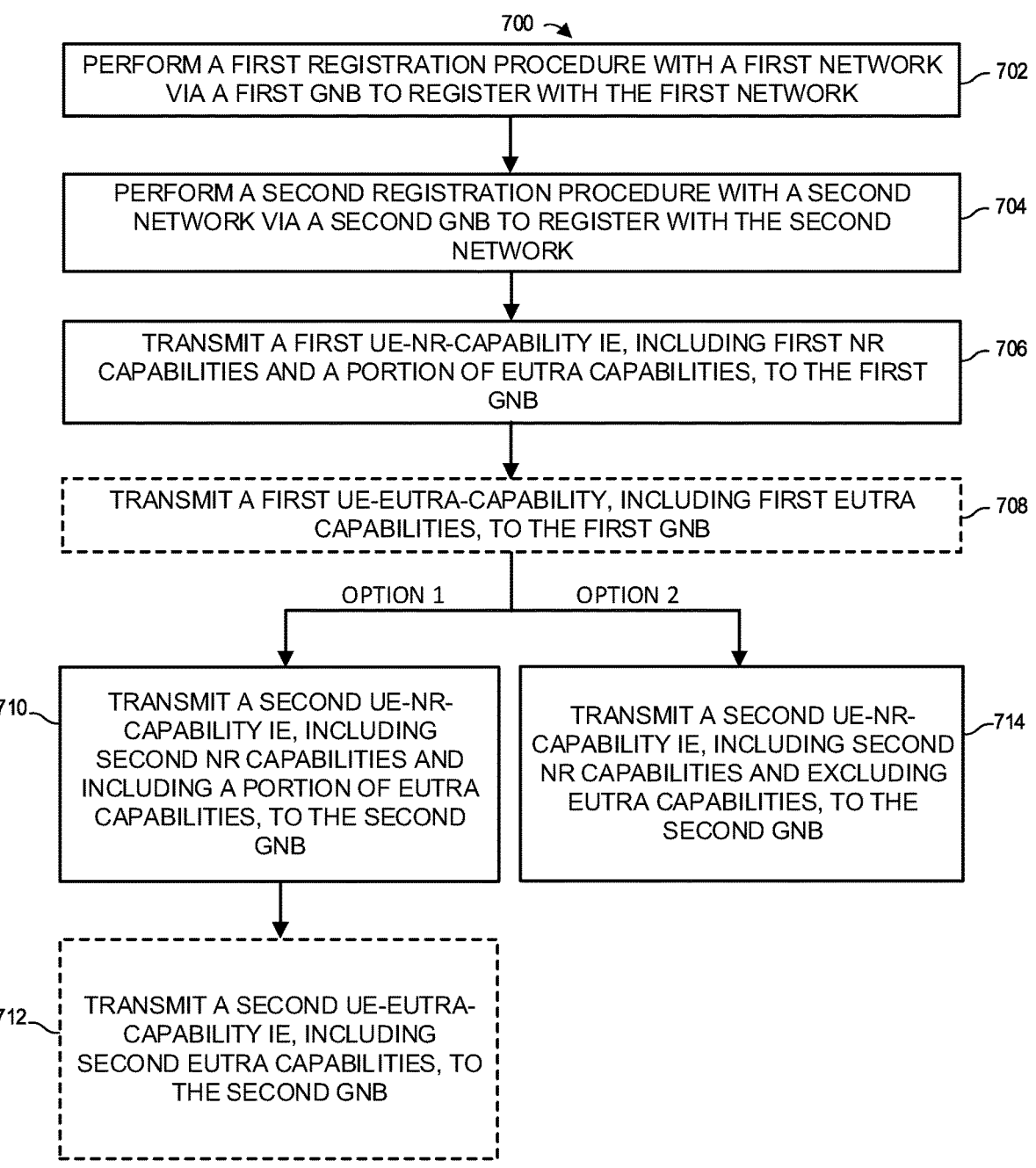

PERFORM A FIRST REGISTRATION PROCEDURE WITH A FIRST NETWORK VIA A FIRST GNB TO REGISTER WITH THE FIRST NETWORK ⟋702

PERFORM A SECOND REGISTRATION PROCEDURE WITH A SECOND NETWORK VIA A SECOND GNB TO REGISTER WITH THE SECOND NETWORK ⟋704

TRANSMIT A FIRST UE-NR-CAPABILITY IE, INCLUDING FIRST NR CAPABILITIES AND A PORTION OF EUTRA CAPABILITIES, TO THE FIRST GNB ⟋706

TRANSMIT A FIRST UE-EUTRA-CAPABILITY, INCLUDING FIRST EUTRA CAPABILITIES, TO THE FIRST GNB ⟋708

OPTION 1                    OPTION 2

710⟍ TRANSMIT A SECOND UE-NR-CAPABILITY IE, INCLUDING SECOND NR CAPABILITIES AND INCLUDING A PORTION OF EUTRA CAPABILITIES, TO THE SECOND GNB

TRANSMIT A SECOND UE-NR-CAPABILITY IE, INCLUDING SECOND NR CAPABILITIES AND EXCLUDING EUTRA CAPABILITIES, TO THE SECOND GNB ⟋714

712⟍ TRANSMIT A SECOND UE-EUTRA-CAPABILITY IE, INCLUDING SECOND EUTRA CAPABILITIES, TO THE SECOND GNB

Figure 7

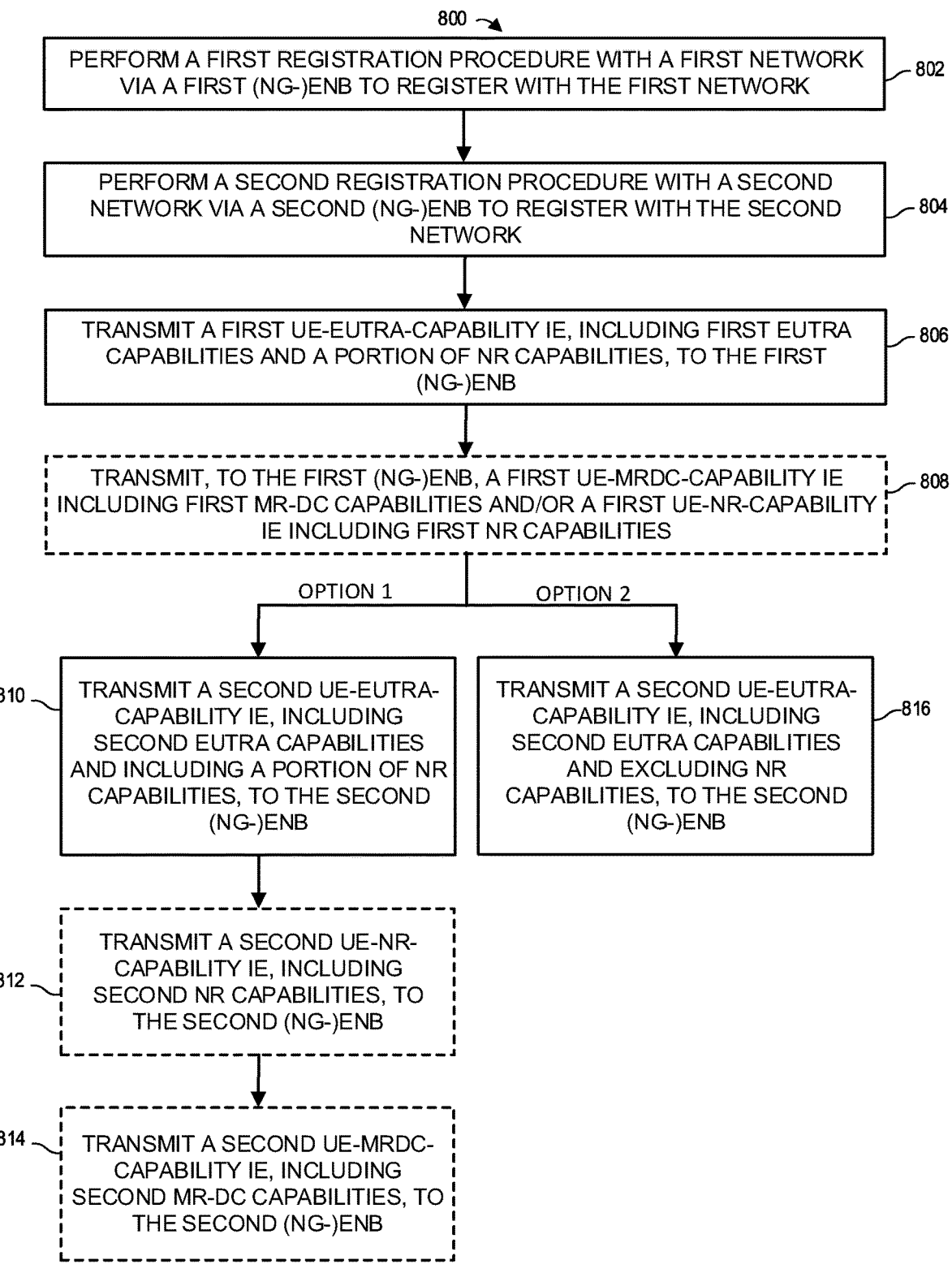

800

PERFORM A FIRST REGISTRATION PROCEDURE WITH A FIRST NETWORK VIA A FIRST (NG-)ENB TO REGISTER WITH THE FIRST NETWORK — 802

PERFORM A SECOND REGISTRATION PROCEDURE WITH A SECOND NETWORK VIA A SECOND (NG-)ENB TO REGISTER WITH THE SECOND NETWORK — 804

TRANSMIT A FIRST UE-EUTRA-CAPABILITY IE, INCLUDING FIRST EUTRA CAPABILITIES AND A PORTION OF NR CAPABILITIES, TO THE FIRST (NG-)ENB — 806

TRANSMIT, TO THE FIRST (NG-)ENB, A FIRST UE-MRDC-CAPABILITY IE INCLUDING FIRST MR-DC CAPABILITIES AND/OR A FIRST UE-NR-CAPABILITY IE INCLUDING FIRST NR CAPABILITIES — 808

OPTION 1                    OPTION 2

810 — TRANSMIT A SECOND UE-EUTRA-CAPABILITY IE, INCLUDING SECOND EUTRA CAPABILITIES AND INCLUDING A PORTION OF NR CAPABILITIES, TO THE SECOND (NG-)ENB

TRANSMIT A SECOND UE-EUTRA-CAPABILITY IE, INCLUDING SECOND EUTRA CAPABILITIES AND EXCLUDING NR CAPABILITIES, TO THE SECOND (NG-)ENB — 816

812 — TRANSMIT A SECOND UE-NR-CAPABILITY IE, INCLUDING SECOND NR CAPABILITIES, TO THE SECOND (NG-)ENB

814 — TRANSMIT A SECOND UE-MRDC-CAPABILITY IE, INCLUDING SECOND MR-DC CAPABILITIES, TO THE SECOND (NG-)ENB

Figure 8

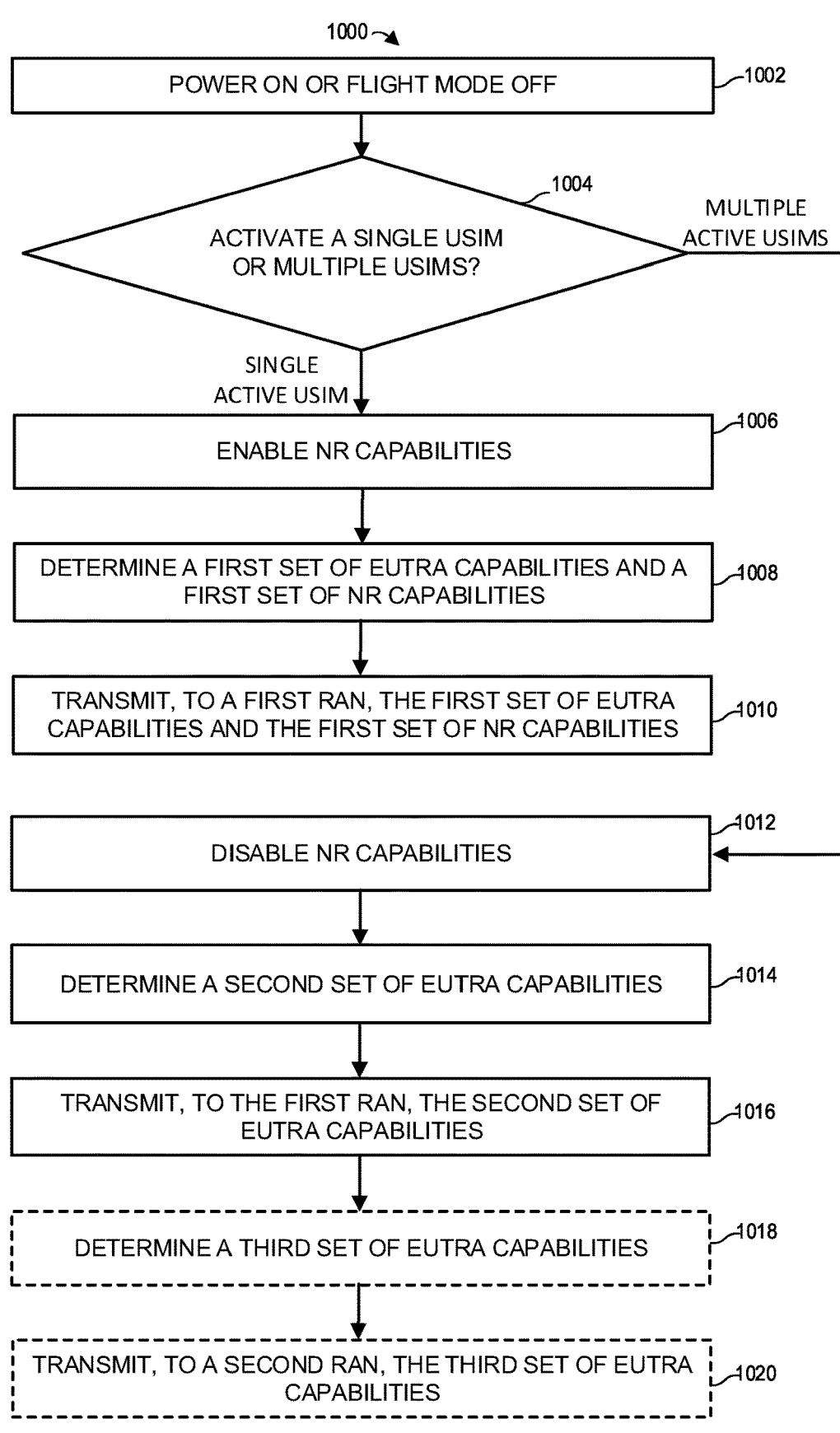

1000

POWER ON OR FLIGHT MODE OFF ~1002

1004

ACTIVATE A SINGLE USIM
OR MULTIPLE USIMS?

MULTIPLE
ACTIVE USIMS

SINGLE
ACTIVE USIM

ENABLE NR CAPABILITIES ~1006

DETERMINE A FIRST SET OF EUTRA CAPABILITIES AND A
FIRST SET OF NR CAPABILITIES ~1008

TRANSMIT, TO A FIRST RAN, THE FIRST SET OF EUTRA
CAPABILITIES AND THE FIRST SET OF NR CAPABILITIES ~1010

DISABLE NR CAPABILITIES ~1012

DETERMINE A SECOND SET OF EUTRA CAPABILITIES ~1014

TRANSMIT, TO THE FIRST RAN, THE SECOND SET OF
EUTRA CAPABILITIES ~1016

DETERMINE A THIRD SET OF EUTRA CAPABILITIES ~1018

TRANSMIT, TO A SECOND RAN, THE THIRD SET OF EUTRA
CAPABILITIES ~1020

Figure 10

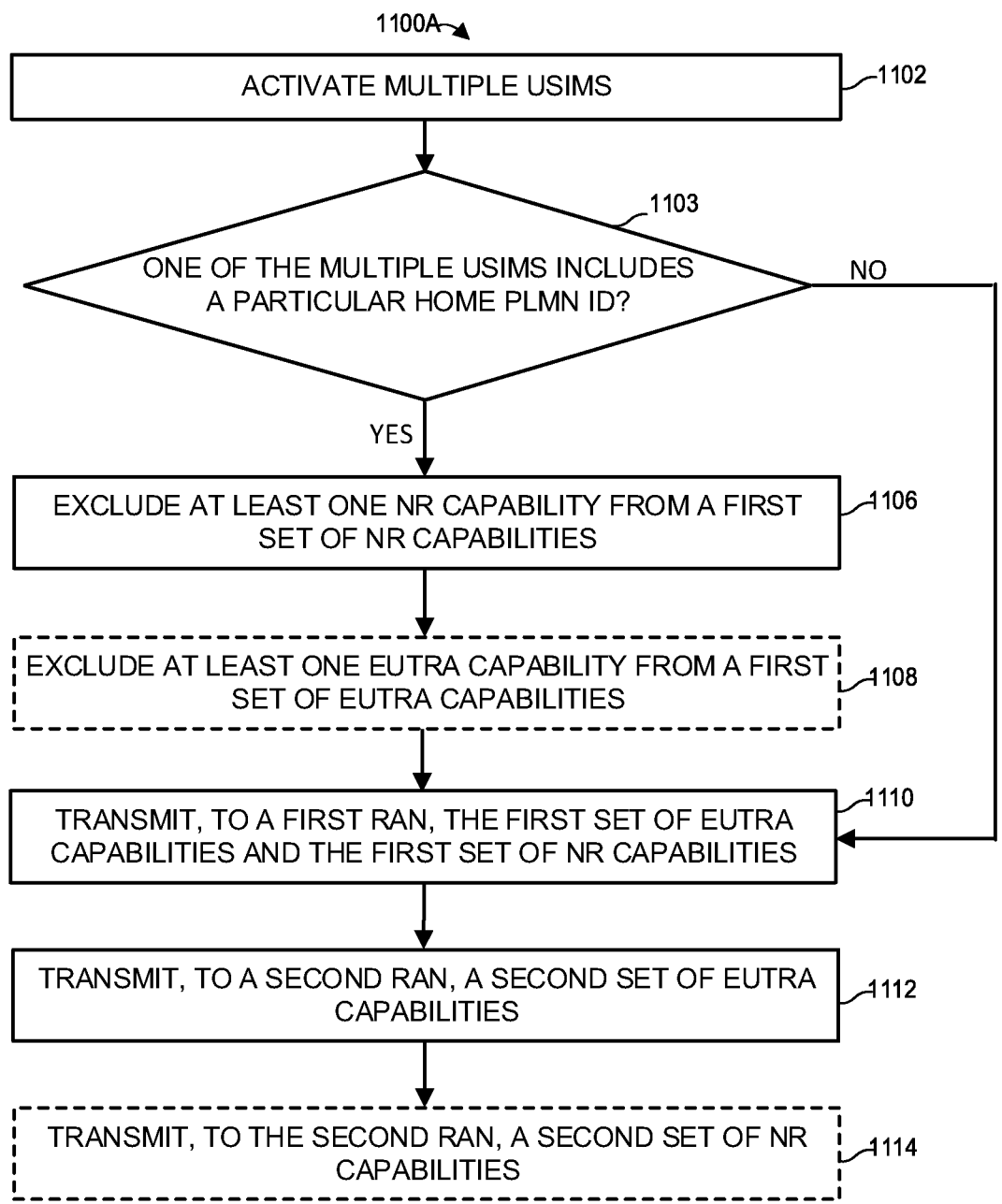

1100A

ACTIVATE MULTIPLE USIMS — 1102

1103
ONE OF THE MULTIPLE USIMS INCLUDES A PARTICULAR HOME PLMN ID?

NO

YES

EXCLUDE AT LEAST ONE NR CAPABILITY FROM A FIRST SET OF NR CAPABILITIES — 1106

EXCLUDE AT LEAST ONE EUTRA CAPABILITY FROM A FIRST SET OF EUTRA CAPABILITIES — 1108

TRANSMIT, TO A FIRST RAN, THE FIRST SET OF EUTRA CAPABILITIES AND THE FIRST SET OF NR CAPABILITIES — 1110

TRANSMIT, TO A SECOND RAN, A SECOND SET OF EUTRA CAPABILITIES — 1112

TRANSMIT, TO THE SECOND RAN, A SECOND SET OF NR CAPABILITIES — 1114

Figure 11A

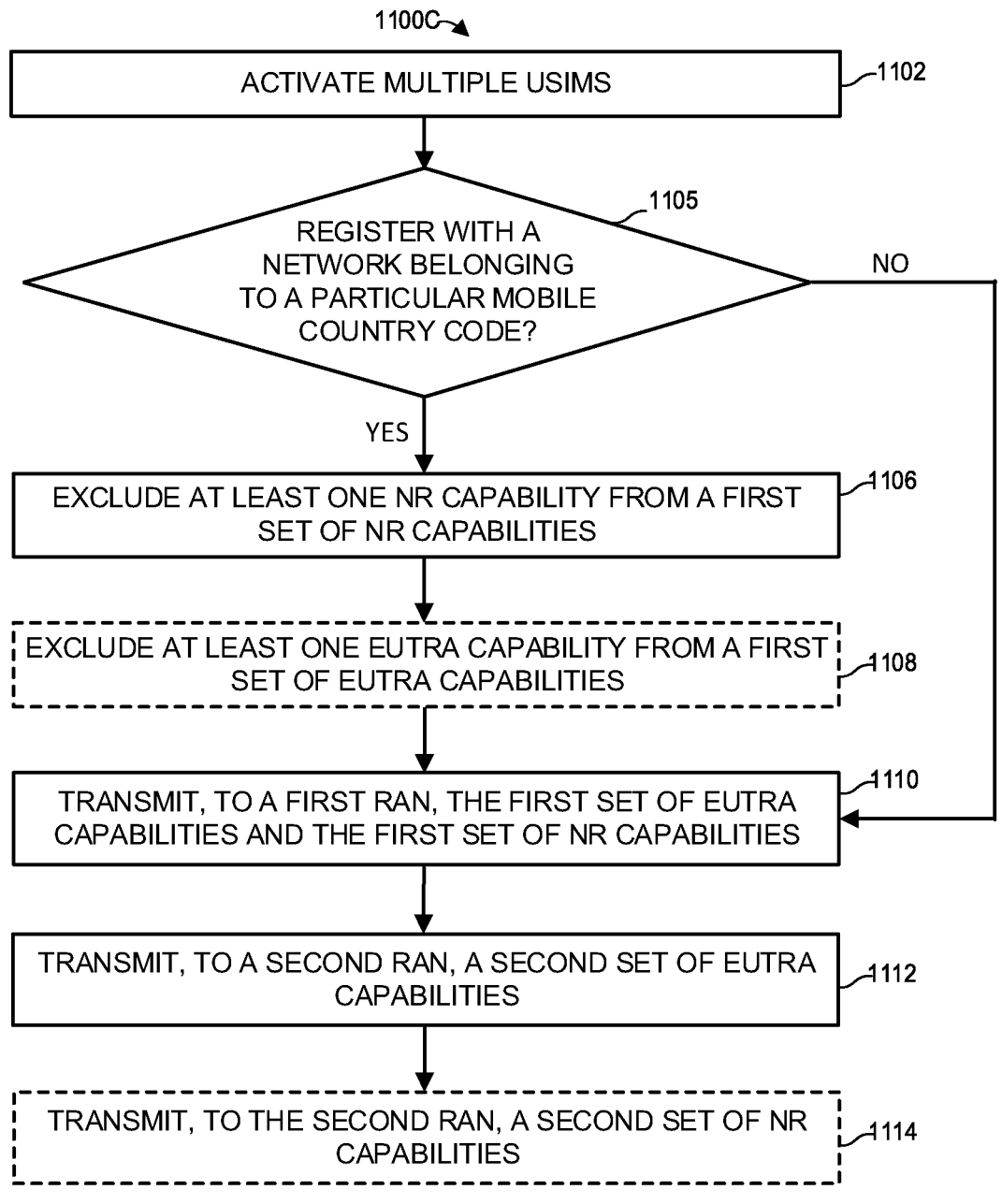

1100C

ACTIVATE MULTIPLE USIMS 1102

REGISTER WITH A NETWORK BELONGING TO A PARTICULAR MOBILE COUNTRY CODE? 1105

NO

YES

EXCLUDE AT LEAST ONE NR CAPABILITY FROM A FIRST SET OF NR CAPABILITIES 1106

EXCLUDE AT LEAST ONE EUTRA CAPABILITY FROM A FIRST SET OF EUTRA CAPABILITIES 1108

TRANSMIT, TO A FIRST RAN, THE FIRST SET OF EUTRA CAPABILITIES AND THE FIRST SET OF NR CAPABILITIES 1110

TRANSMIT, TO A SECOND RAN, A SECOND SET OF EUTRA CAPABILITIES 1112

TRANSMIT, TO THE SECOND RAN, A SECOND SET OF NR CAPABILITIES 1114

Figure 11C

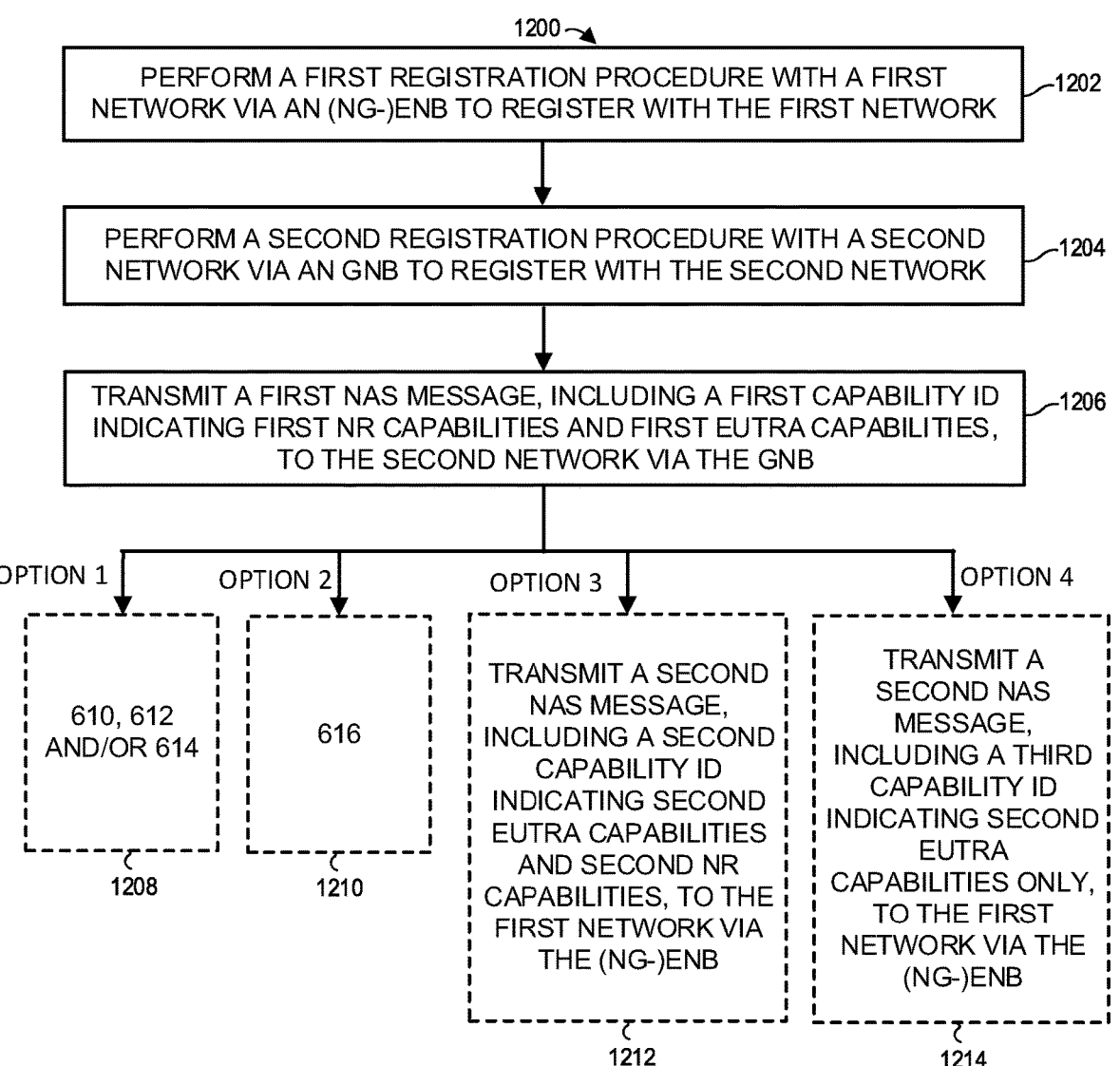

1200

PERFORM A FIRST REGISTRATION PROCEDURE WITH A FIRST NETWORK VIA AN (NG-)ENB TO REGISTER WITH THE FIRST NETWORK — 1202

PERFORM A SECOND REGISTRATION PROCEDURE WITH A SECOND NETWORK VIA AN GNB TO REGISTER WITH THE SECOND NETWORK — 1204

TRANSMIT A FIRST NAS MESSAGE, INCLUDING A FIRST CAPABILITY ID INDICATING FIRST NR CAPABILITIES AND FIRST EUTRA CAPABILITIES, TO THE SECOND NETWORK VIA THE GNB — 1206

OPTION 1

610, 612 AND/OR 614

1208

OPTION 2

616

1210

OPTION 3

TRANSMIT A SECOND NAS MESSAGE, INCLUDING A SECOND CAPABILITY ID INDICATING SECOND EUTRA CAPABILITIES AND SECOND NR CAPABILITIES, TO THE FIRST NETWORK VIA THE (NG-)ENB

1212

OPTION 4

TRANSMIT A SECOND NAS MESSAGE, INCLUDING A THIRD CAPABILITY ID INDICATING SECOND EUTRA CAPABILITIES ONLY, TO THE FIRST NETWORK VIA THE (NG-)ENB

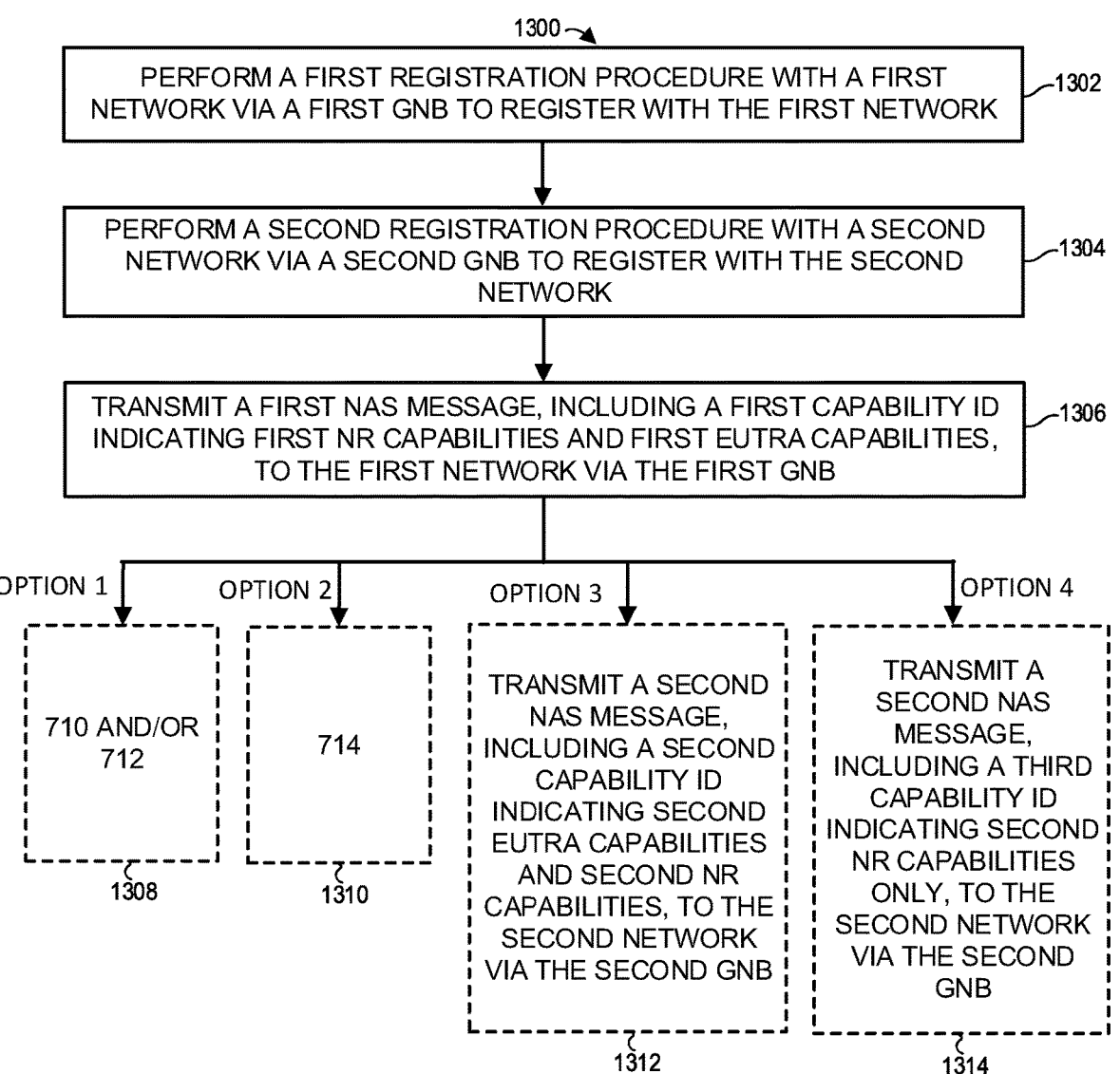

1300

PERFORM A FIRST REGISTRATION PROCEDURE WITH A FIRST NETWORK VIA A FIRST GNB TO REGISTER WITH THE FIRST NETWORK ——1302

PERFORM A SECOND REGISTRATION PROCEDURE WITH A SECOND NETWORK VIA A SECOND GNB TO REGISTER WITH THE SECOND NETWORK ——1304

TRANSMIT A FIRST NAS MESSAGE, INCLUDING A FIRST CAPABILITY ID INDICATING FIRST NR CAPABILITIES AND FIRST EUTRA CAPABILITIES, TO THE FIRST NETWORK VIA THE FIRST GNB ——1306

OPTION 1

710 AND/OR 712

1308

OPTION 2

714

1310

OPTION 3

TRANSMIT A SECOND NAS MESSAGE, INCLUDING A SECOND CAPABILITY ID INDICATING SECOND EUTRA CAPABILITIES AND SECOND NR CAPABILITIES, TO THE SECOND NETWORK VIA THE SECOND GNB

1312

OPTION 4

TRANSMIT A SECOND NAS MESSAGE, INCLUDING A THIRD CAPABILITY ID INDICATING SECOND NR CAPABILITIES ONLY, TO THE SECOND NETWORK VIA THE SECOND GNB

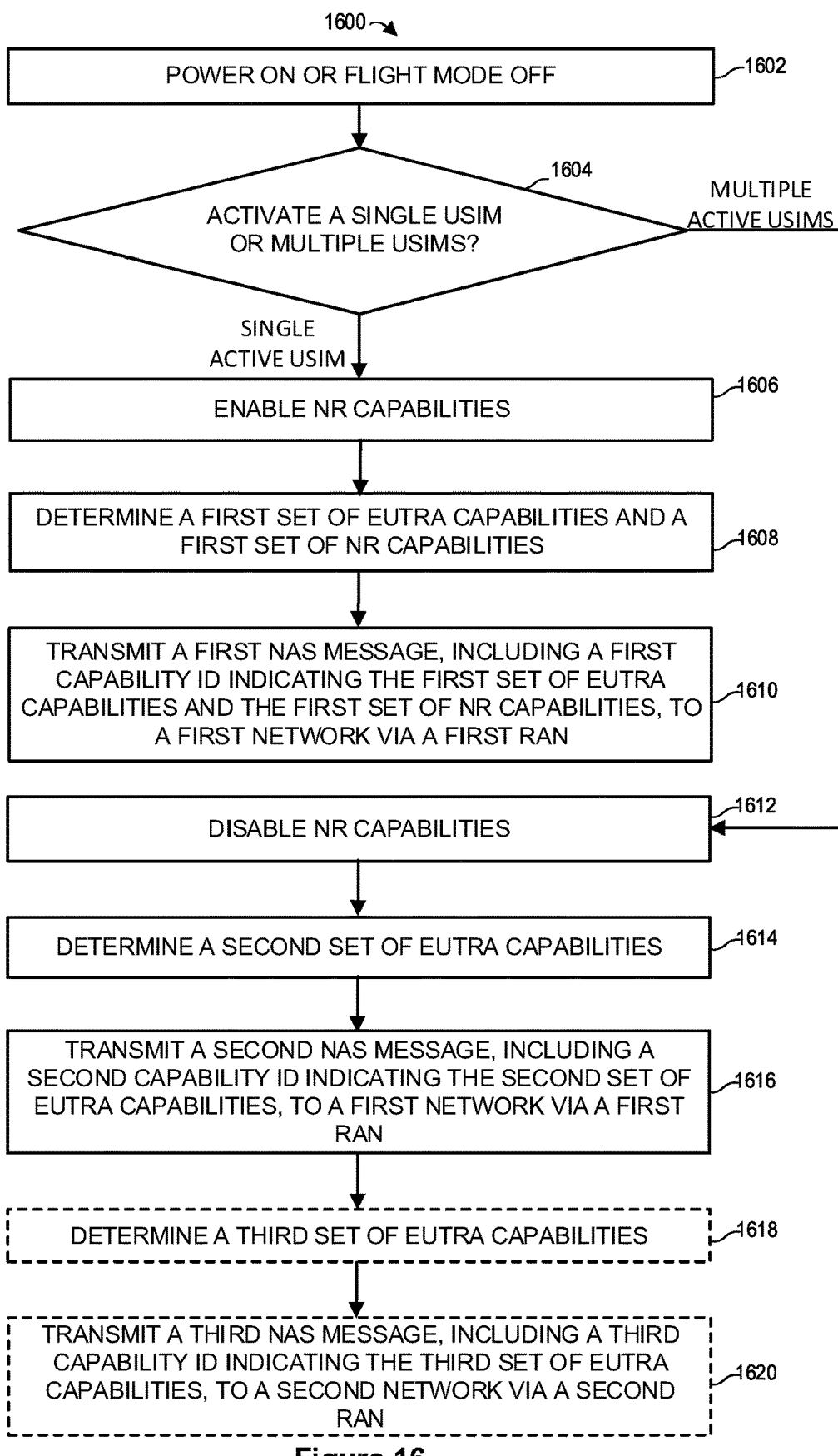

1600

POWER ON OR FLIGHT MODE OFF                                          1602

ACTIVATE A SINGLE USIM
OR MULTIPLE USIMS?                                                   1604

MULTIPLE
ACTIVE USIMS

SINGLE
ACTIVE USIM

ENABLE NR CAPABILITIES                                              1606

DETERMINE A FIRST SET OF EUTRA CAPABILITIES AND A
FIRST SET OF NR CAPABILITIES                                        1608

TRANSMIT A FIRST NAS MESSAGE, INCLUDING A FIRST
CAPABILITY ID INDICATING THE FIRST SET OF EUTRA
CAPABILITIES AND THE FIRST SET OF NR CAPABILITIES, TO              1610
A FIRST NETWORK VIA A FIRST RAN

DISABLE NR CAPABILITIES                                            1612

DETERMINE A SECOND SET OF EUTRA CAPABILITIES                       1614

TRANSMIT A SECOND NAS MESSAGE, INCLUDING A
SECOND CAPABILITY ID INDICATING THE SECOND SET OF                 1616
EUTRA CAPABILITIES, TO A FIRST NETWORK VIA A FIRST
RAN

DETERMINE A THIRD SET OF EUTRA CAPABILITIES                        1618

TRANSMIT A THIRD NAS MESSAGE, INCLUDING A THIRD
CAPABILITY ID INDICATING THE THIRD SET OF EUTRA                    1620
CAPABILITIES, TO A SECOND NETWORK VIA A SECOND
RAN

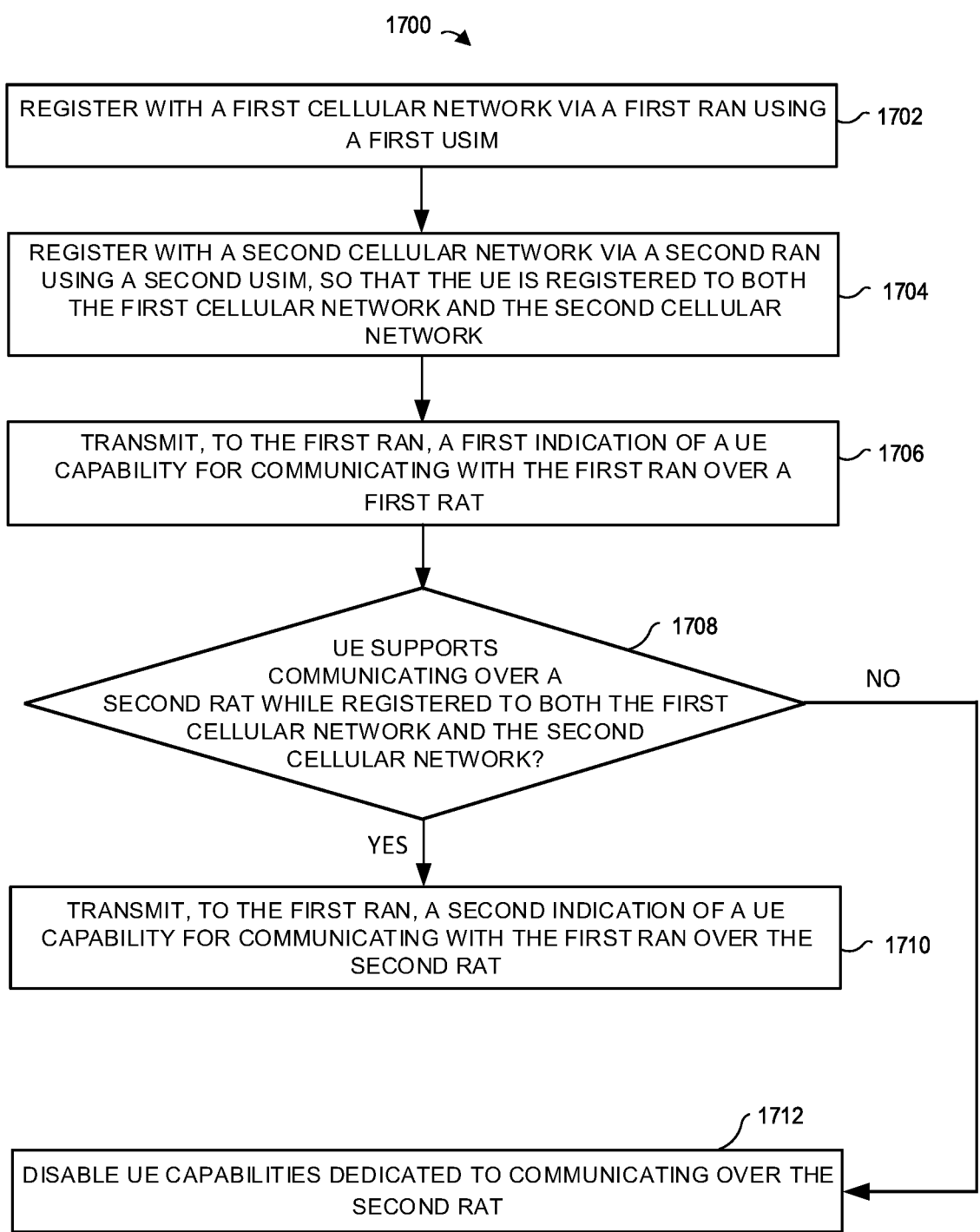

REGISTER WITH A FIRST CELLULAR NETWORK VIA A FIRST RAN USING A FIRST USIM ⟋ 1702

REGISTER WITH A SECOND CELLULAR NETWORK VIA A SECOND RAN USING A SECOND USIM, SO THAT THE UE IS REGISTERED TO BOTH THE FIRST CELLULAR NETWORK AND THE SECOND CELLULAR NETWORK ⟋ 1704

TRANSMIT, TO THE FIRST RAN, A FIRST INDICATION OF A UE CAPABILITY FOR COMMUNICATING WITH THE FIRST RAN OVER A FIRST RAT ⟋ 1706

UE SUPPORTS COMMUNICATING OVER A SECOND RAT WHILE REGISTERED TO BOTH THE FIRST CELLULAR NETWORK AND THE SECOND CELLULAR NETWORK? ⟋ 1708

NO

YES

TRANSMIT, TO THE FIRST RAN, A SECOND INDICATION OF A UE CAPABILITY FOR COMMUNICATING WITH THE FIRST RAN OVER THE SECOND RAT ⟋ 1710

⟋ 1712

DISABLE UE CAPABILITIES DEDICATED TO COMMUNICATING OVER THE SECOND RAT

Figure 17

MANAGING USER EQUIPMENT CAPABILITIES IN SINGLE AND MULTIPLE REGISTRATION SCENARIOS

TECHNICAL FIELD

This disclosure relates generally to wireless communications and, more particularly, to managing UE capabilities related to different radio access technologies when the UE is registered to a single network or registered to multiple networks.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When expanding wireless communication networks, operators sometimes configure base stations to connect to core networks (CNs) of different types. Accordingly, these base stations and compatible user devices (commonly referred to as "user equipment" or "UE") can support air interfaces for establishing connections to different types of CNs. For example, an Evolved Universal Mobile Telecommunications System Terrestrial Radio Access (EUTRA) base station (i.e., eNB) that operates in a Long Term Evolution (LTE) network can connect to an evolved packet core (EPC). In another example, an EUTRA base station (i.e., ng-eNB) that operates in an LTE network can connect to a more advanced fifth-generation core (5GC). In another example, a new radio (NR) base station (i.e., gNB) that operates in NR (i.e., 5G) network can connect to a 5GC.

A UE in some cases can concurrently utilize resources of multiple network nodes, e.g., base stations, interconnected by a backhaul. When these network nodes support the same radio access technology (RAT) or different RATs, this type of connectivity is referred to as Dual Connectivity (DC) or Multi-Radio DC (MR-DC), respectively. Typically, when a UE operates in DC or MR-DC, one base station operates as a master node (MN), and the other base station operates as a secondary node (SN). The backhaul can support an X2 or Xn interface, for example.

The MN can provide a control-plane connection and a user-plane connection to a CN, whereas the SN generally provides only a user-plane connection. The cells associated with the MN define a master cell group (MCG), and the cells associated with the SN define a secondary cell group (SCG). The UE and the base stations MN and SN can use signaling radio bearers (SRBs) to exchange radio resource control (RRC) messages, as well as non-access stratum (NAS) messages.

There are several types of SRBs that a UE can use when operating in DC. SRB1 and SRB2 resources allow the UE and the MN to exchange RRC messages related to the MN and to embed RRC messages related to the SN, and can be referred to as MCG SRBs. SRB3 resources allow the UE and the SN to exchange RRC messages related to the SN, and can be referred to as an SCG SRB. Split SRBs allow the UE to exchange RRC messages directly with the MN by using radio resources of the MN, the SN, or both the MN and SN. Further, the UE and the base stations (e.g., MN and SN) use data radio bearers (DRBs) to transport data on a user plane. DRBs terminated at the MN and using the lower-layer resources of only the MN can be referred to as MCG DRBs, DRBs terminated at the SN and using the lower-layer resources of only the SN can be referred to as SCG DRBs, and DRBs terminated at the MCG but using the lower-layer resources of both the MN and the SN can be referred to as split DRBs. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

A UE can be equipped with multiple Universal Subscriber Identity Modules (USIMs) that can access services provided by respective cellular networks. If the UE activates a single USIM, the UE can register with a single cellular network. However, if the UE activates multiple USIMs, the UE can simultaneously be registered with multiple respective cellular networks. For example, the UE can register with an EPC via an eNB using a first USIM and register with a 5GC via a gNB using a second USIM.

However, if a multi-USIM UE is registered with more than one cellular network, it is not clear how the UE is to use its UE capabilities, including capabilities relevant to different RATs, to communicate with the respective cellular networks.

SUMMARY

A multi-USIM UE implements the techniques of this disclosure to report UE capabilities when registered to multiple cellular networks using multiple, respective USIMs. In particular, a UE of this disclosure registered to two cellular networks reports UE capabilities related to at least two RATs to one or both of the cellular networks.

For example, a UE equipped with two USIMs can register with a first cellular network including a first RAN and a second cellular network including a second RAN. The first and second RANs may correspond to a 4G RAN (e.g., an Evolved Universal Terrestrial Radio Access Network EUTRAN) and a 5G RAN (e.g., a next-generation (NG) RAN), respectively. Alternatively, both the first and second RANs may be 4G RANs, or 5G RANs. The UE can then provide UE capabilities to both the first and second RANs.

If providing UE capability information to a 4G RAN, the UE can transmit an RRC message including an information element (IE) (e.g., a UE SUTRA-Capability IE) to indicate UE capabilities for communicating with the 4G RAN over a 4G RAT. However, the UE can also include, in the IE, UE capabilities for communicating over a 5G RAT. For example, the UE may indicate frequencies that the UE supports for NR, or indicate whether the UE supports MR-DC. After receiving the UE capabilities, the 4G RAN may request more detailed UE capability information related to the 5G RAT.

Similarly, if providing UE capability information to a 5G RAN, the UE can transmit an IE (e.g., a UE-NR-Capability IE) to indicate both UE capabilities for over the 4G RAT and UE capabilities for communicating over the 5G RAT.

In some implementations, instead of providing UE capabilities to the first RAN and/or the second RAN in an RRC message, the UE can provide a capability identifier in a non-access stratum (NAS) message to a core network (CN). The CN that receives the capability identifier can determine the UE capabilities based on the capability identifier (e.g., by locating the capability identifier in a lookup-table) and provide the UE capabilities to the RAN.

Depending on the implementation, the UE capabilities that the UE provides to a first RAN for a particular RAT may be different from the UE capabilities that the UE provides to a second RAN for the same RAT. For example, if the UE is capable of communicating with both RANs simultaneously via two active links, the UE may need to dedicate a different portion of its resources to each RAN. In another example, if the UE is not capable of communicating with both RANs simultaneously via two active links, the UE may dedicate the same portion of its resources to each RAN. As yet another example, UE capabilities may vary depending on the home public land mobile network (PLMN) identifier of the USIM, the cellular network, and/or the country code of the cellular network.

Further, in some implementations, a UE registered to two cellular networks may be unable to communicate with either cellular network via a 5G RAT (e.g., due to hardware limitations). In such implementations, the UE can disable 5G capabilities, and only report 4G capabilities to both cellular networks.

One example embodiment of these techniques is a method in a UE for managing UE capability information, the UE equipped with a first USIM for communicating with a first cellular network and a second USIM for communicating with a second cellular network, the first cellular network including a first RAN and the second cellular network including a second RAN. The method may be executed by processing hardware and includes registering with the first cellular network via the first RAN using the first USIM and registering with the second cellular network via the second RAN using the second USIM, so that the UE is registered to both the first cellular network and the second cellular network. The method further includes transmitting, to first RAN, a first indication of a UE capability for communicating with the first RAN over a first RAT; and based on whether the UE supports communicating over a second RAT, which is different from the first RAT, while registered to both the first cellular network and the second cellular network, either: (i) transmitting, by the processing hardware to the first RAN, a second indication of a UE capability for communicating with the first RAN over the second RAT; or (ii) disabling, by the processing hardware, UE capabilities dedicated to communicating over the second RAT.

Another example embodiment of these techniques is a UE including processing hardware and configured to implement the method above.

BRIEF DESCRIPTION OF THE DRAWINGS

FIG. 7 is a flow diagram of an example method for providing UE capability information to a first network via a first NR base station and to a second network via a second NR base station, which can be implemented by a UE;

FIG. 8 is a flow diagram of an example method for providing UE capability information to a first network via a first EUTRA base station and to a second network via a second EUTRA base station, which can be implemented by a UE;

FIG. 10 is a flow diagram of an example method for determining whether to enable or disable NR capabilities based on whether a UE has one or multiple USIMs activated, which can be implemented by the UE;

FIG. 11A is a flow diagram of an example method for managing UE capability information based on whether an activated USIM of a UE includes a particular home public land mobile network (PLMN) identifier, which can be implemented by the UE;

FIG. 11C is a flow diagram of an example method for managing UE capability information based on whether a UE is registered with a network belonging to a particular mobile country code, which can be implemented by the UE;

FIGS. 12-16 are flow diagram of example methods similar to the example methods of FIGS. 6-10, respectively, but where the UE can indicate UE capability information in a non-access stratum (NAS) message including a capability identifier; and FIG. 17 is a flow diagram of an example method for managing UE capability information, which can be implemented by a UE of FIG. 1A.

DETAILED DESCRIPTION OF THE DRAWINGS

As discussed in detail below, a UE and/or network nodes of a radio access network (RAN) can implement the techniques disclosed herein to manage UE capabilities. Prior to discussing these techniques, example communication systems which can implement these techniques are considered with reference to FIGS. 1A & 1B.

Figure 1A:
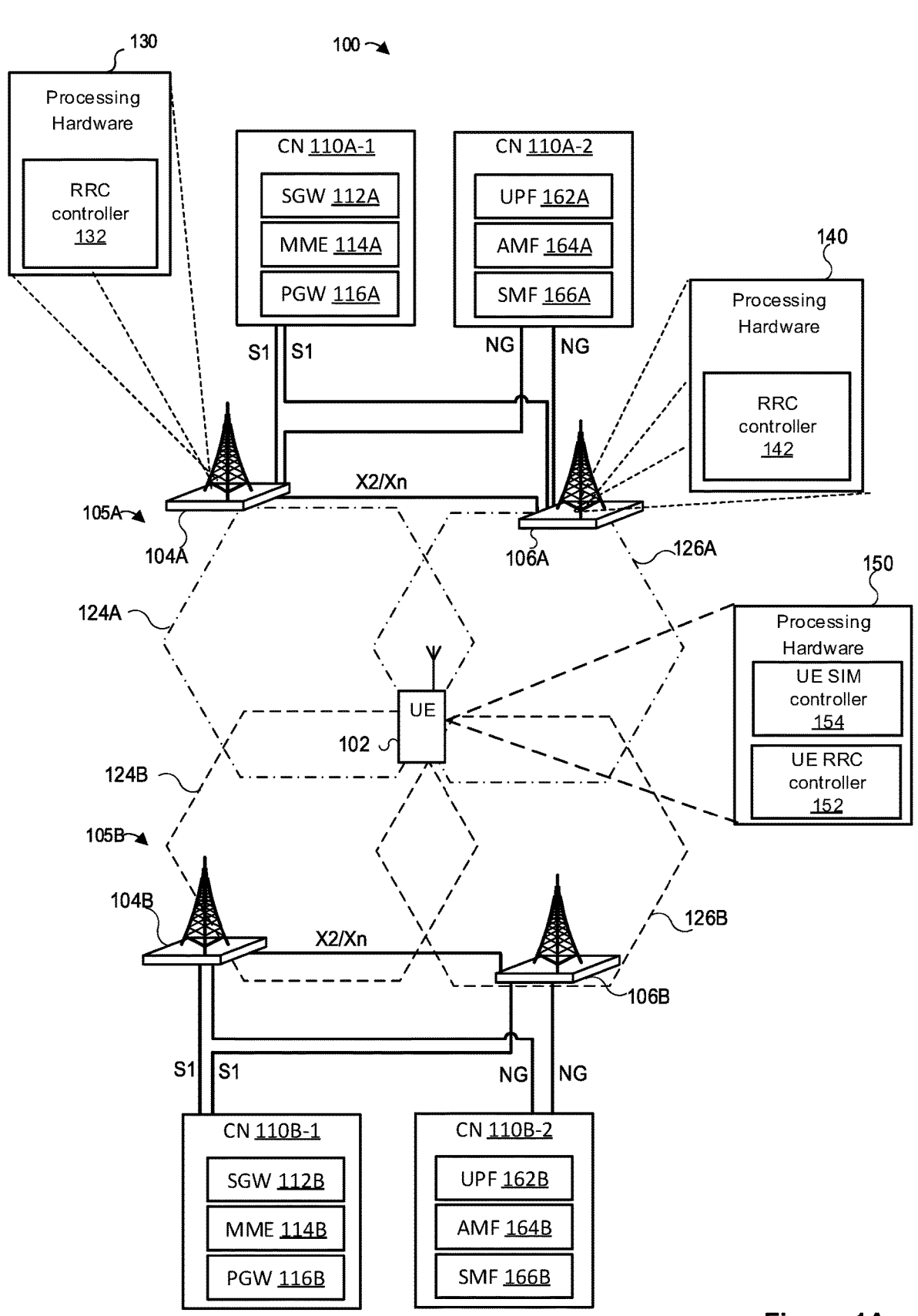
FIG. 1A is a block diagram of an example system, including two cellular networks, in which one or more base stations and/or a user equipment (UE) can implement the techniques of this disclosure for managing UE radio capabilities.

FIG. 1A depicts an example wireless communication system 100 that includes a UE 102, a base station (BS) 104A, a base station 106A, a base station 104B, a base station 106B, a core network (CN) 110A-1, a CN 110A-2, a CN 110B-1, and a CN 110B-2. The base stations 104A and 106A can operate in a RAN 105A connected to the CN 110A-1 and/or the CN 110A-2. In the example wireless communication system 100, the CN 110A-1 is implemented as an evolved packet core (EPC), and the CN 110A-2 is implemented as a fifth generation (5G) core (5GC). CN 110A is used herein to represent either the CN 110A-1 or the CN 110A-2. The RAN 105A and CN 110A can form a first public land mobile network (PLMN) or a first standalone non-public network (SNPN). The base stations 104B and 106B can operate in a RAN 105B connected to the CN 110B-1 and/or the CN 110B-2. In the example wireless communication system 100, the CN 110B-1 is implemented as an EPC, and the CN 110B-2 is implemented as a 5GC. CN 110B is used herein to represent either the CN 110B-1 or the CN 110B-2. The RAN 105B and CN 110B can form a second PLMN or a second SNPN. In case of RAN sharing between the CN 110A and CN 110B, the base station 104A can connect to the CN 110B. The CN 110A-1 and the CN 110A-2 can be managed by a first network operator, and the CN 110B-1 and the CN 110B-2 can be managed by a second network operator that is different from the first network operator.

Among other components, each EPC (i.e., the CN 110A-1 or the CN 110B-1) can include a Serving Gateway (SGW) 112, a Mobility Management Entity (MME) 114, and a Packet Data Network Gateway (PGW) 116. The SGW 112 in general is configured to transfer user-plane packets related to audio calls, video calls, Internet traffic, etc., and the MME 114 is configured to manage authentication, registration, paging, and other related functions. The PGW 116 provides connectivity from the UE 102 to one or more external packet data networks, e.g., an Internet network and/or an Internet Protocol (IP) Multimedia Subsystem (IMS) network. Each 5GC (i.e., the CN 110A-2 or the CN 110B-2) includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

The RAN 105A includes the base stations 104A and 106A, and the RAN 105B includes the base stations 104B and 106B. The base stations 104A, 104B, 106A, and 106B can be any suitable type, or types, of base stations, such as an evolved node B (eNB), a next generation eNB (ng-eNB), or a 5G Node B (gNB), for example. The base stations 104A and 106A of the RAN 105A can be connected to one or both of the CN 110A-1 and the CN 110A-2, and the base stations 104B and 106B of the RAN 105B can be connected to one or both of the CN 110B-1 and the CN 110B-2. Depending on the implementation, the base stations 104A and 106A can support an S1 interface for communicating with the CN 110A-1 and/or an NG interface for communicating with the CN 110A-2. Similarly, the base stations 104B and 106B can support an S1 interface for communicating with the CN 110B-1 and/or an NG interface for communicating with the CN 110B-2.

As illustrated in FIG. 1A, the base station 104A supports a cell 124A, and the base station 106A supports a cell 126A. The cells 124A and 126A can partially overlap. In some cases, the UE 102 can communicate in DC with the base station 104A and the base station 106A operating as a master node (MN) and a secondary node (SN), respectively. In other cases, the UE 102 can be handed over or be redirected from the base station 104A to the base station 106A or vice versa. To directly exchange messages during DC scenarios and/or handover scenarios, the base station 104A and the base station 106A can support an X2 or Xn interface. In general, the CN 110A can connect to any suitable number of base stations supporting 5G new radio (NR) cells and/or EUTRA cells.

Similarly, the base station 104B supports a cell 124B, and the base station 106B supports a cell 126B. The cells 124B and 126B can partially overlap. In some cases, the UE 102 can communicate in DC with the base station 104B and the base station 106B operating as a master node (MN) and a secondary node (SN), respectively. In other cases, the UE 102 can be handed over or be redirected from the base station 104B to the base station 106B or vice versa. To directly exchange messages during DC scenarios and/or handover scenarios, the base station 104B and the base station 106B can support an X2 or Xn interface. In general, the CN 110B can connect to any suitable number of base stations supporting 5G new radio (NR) cells and/or EUTRA cells.

The cells 124A or 126A can overlap with the cells 124B or 126B, so that the UE 102 can operates in dual registration mode (i.e., the UE can be registered with the CN 110A and the CN 110B via the RAN 105A and the RAN 105B, respectively). In some implementations, the UE 102 can first use a first USIM to perform a first registration procedure with the CN 110A via the RAN 105A (e.g., via base station 104A or 106A) to register with the CN 110A. If the UE 102 successfully completes the first registration procedure, the UE 102 has registered with the CN 110A. After the UE 102 completes the first registration procedure, the UE 102 can use a second USIM to perform a second registration procedure with the CN 110B via the RAN 105B (e.g., base station 104B or 106B). In such implementations, the UE 102 may not be capable of simultaneous connectivity with the RAN 105A and the RAN 105B. If the UE 102 is only equipped with a single USIM (i.e., the first USIM) or the UE 102 is equipped with the first and second USIMs but can only activate a single USIM (i.e., the first USIM) at a time, the UE 102 only performs the first registration procedures. In other implementations, the UE 102 is capable of simultaneous connectivity with both the RAN 105A and the RAN 105B. In such implementations, the UE 102 can simultaneously perform the first and second registration procedures. In some scenarios, if the first and second USIMs are provided by the same network operator (i.e., the first network operator), the UE 102 can perform the first and second registration procedures with the CN 110A via different cells of the RAN 105A. In such cases, the cells are operated by the same or different base stations on the same or different carrier frequencies.

During or after the registration procedure (i.e., the first registration procedure or the second registration procedure), the RAN 105 (i.e., the RAN 105A or 105B) can send at least one UECapabilityEnquiry message to the UE 102. In response, the UE 102 sends a UECapabilityInformation message including radio capabilities of the UE 102 to the RAN 105.

In some implementations, during or after the first registration procedure, the RAN 105 sends a first UECapabilityEnquiry message to the UE 102 to request the NR capabilities of the UE 102 (e.g., the RAN 105 can include an "nr" indication in the UECapabilityEnquiry message). In response, the UE 102 sends a first UECapabilityInformation message including a UE-NR-Capability IE to the RAN 105. In the UE-NR-Capability IE, the UE 102 can include NR capabilities of the UE 102 and can optionally include at least a portion of EUTRA capabilities of the UE 102 (referred to in this disclosure as a portion of EUTRA capabilities for brevity). For example, the NR capabilities can include PDCP capabilities, RLC capabilities, MAC capabilities, physical layer capabilities, radio frequency (RF) capabilities, measurement and mobility capabilities, feature set(s), and/or feature set combination(s). In one example, the portion of EUTRA capabilities includes EUTRA frequency bands. In another example, the portion of EUTRA capabilities includes an indication that the UE 102 supports NR-EUTRA dual connectivity (NE-DC), an mfbi-EUTRA field, a multiNS-Pmax-EUTRA field, an rs-SINR-MeasEUTRA field, and/or an nr-HO-ToEN-DC-r16 field. The portion of EUTRA capabilities that the UE 102 includes in the UE-NR-Capability IE may include fewer capabilities than the total EUTRA capabilities of the UE 102 and/or fewer capabilities than the number of NR capabilities that the UE 102 includes in the UE-NR-Capability IE. By including the portion of EUTRA capabilities in the UE-NR-Capability IE, the UE 102 indicates to the RAN 105 that the UE 102 supports communicating with an EUTRAN via an EUTRA RAT.

In other implementations, during or after the registration procedure (i.e., the first registration procedure or the second registration procedure), the RAN 105 (i.e., the RAN 105A or 105B) sends a second UECapabilityEnquiry message to the UE 102 to request the EUTRA capabilities of the UE 102 (e.g., the RAN 105 can include an "eutra" indication in the UECapabilityEnquiry message). In response, the UE 102 sends a second UECapabilityInformation message including a UE-EUTRA-Capability IE to the RAN 105. In the UE-EUTRA-Capability IE, the UE 102 can include EUTRA capabilities of the UE 102 and can optionally include at least a portion of NR capabilities of the UE 102 (referred to in this disclosure as a portion of NR capabilities for brevity). For example, the EUTRA capabilities can include a UE category, PDCP capabilities, physical layer capabilities, RF capabilities, measurement capabilities, and/or mobility capabilities. In one example, the portion of NR capabilities includes NR frequency bands that the UE 102 supports for NR standalone mode. In another example, the portion of NR capabilities includes NR frequency bands for EUTRA-NR dual connectivity (EN-DC) that the UE 102 supports. In yet another example, the portion of NR capabilities includes an indication that the UE 102 supports EN-DC, an indication that the UE 102 supports next generation (NG) EN-DC (NG-EN-DC), and/or an indication that the UE 102 supports NR standalone mode. In a further example, the portion of NR capabilities includes an indication that the UE 102 supports event B2 for NR measurement reporting. In yet another example, the portion of NR capabilities includes NR PDCP capabilities. In another example, the portion of NR capabilities includes one or more handover to NR capabilities such as handover to NR frequency division duplex (FDD) frequency range 1 (FR1) and/or handover to time division duplex (TDD) FR1. In a further example, the portion of NR capabilities includes an IMS voice over NR capability.

In yet other implementations, during or after the registration procedure (i.e., the first registration procedure or the second registration procedure), the RAN 105 (i.e., the RAN 105A or 105B) can send a third UECapabilityEnquiry message to the UE 102 to request the MR-DC capabilities of the UE 102 (e.g., the RAN can include an "eutra-nr" indication in the UECapabilityEnquiry message). In response, the UE 102 sends a third UECapabilityInformation message including a UE-MRDC-Capability IE to the RAN 105. The UE 102 can include EN-DC, NG-EN-DC and/or NE-DC capabilities of the UE 102 in the UE-EUTRA-Capability IE.

In some implementations, during or after the registration procedure, the RAN 105 can transmit a UECapabilityEnquiry message (i.e., including multiple indications such as "nr", "eutra" and/or "eutra-nr") to the UE 102 to request that the UE 102 provide NR capabilities, EUTRA capabilities and/or MR-DC capabilities. In response to the UECapabilityEnquiry message, the UE 102 transmits to the RAN 105 a UECapabilityInformation message including the UE-NR-Capability IE, the UE-EUTRA-Capability IE, and/or the UE-MRDC-Capability IE.

In cases in which the UE 102 performs a registration procedure (e.g., the first registration procedure or the second registration procedure) with an EPC (e.g., the CN 110A-1 or 110B-1, or the MME 114A or 114B) via a RAN (e.g., EUTRAN 105A or 105B, or eNB 104A or 104B), the registration procedure can be an attach procedure or a tracking area update procedure, as specified in 3GPP specification 24.301. To perform the attach procedure, the UE 102 sends an Attach Request message to the EPC via the RAN. In response, the EPC sends an Attach Accept message to the UE 102 via the RAN. In response to the Attach Accept message, the UE 102 can send an Attach Complete message to the EPC via the RAN. To perform the tracking area update procedure, the UE 102 sends a Tracking Area Update Request message to the EPC via the RAN. In response, the EPC sends a Tracking Area Update Accept message to the UE 102 via the RAN. In response to the Tracking Area Update Accept message, the UE 102 can send a Tracking Area Update Complete message to the EPC via the RAN. The UE 102 successfully completes the registration procedure once the UE 102 receives the Attach Accept message or the Tracking Area Update Accept message, or transmits the Attach Complete message or the Tracking Area Update Complete message.

In cases in which the UE 102 performs a registration procedure (e.g., the first registration procedure or the second registration procedure) with a 5GC (e.g., the CN 110A-2 or the CN 110B-2, or the AMF 164A or 164B) via a RAN (e.g., NG RAN 105A or 105B, or ng-eNB or gNB 104A or 104B), the registration procedure can be a registration procedure as specified in 3GPP specification 24.501. To perform the registration procedure, the UE 102 sends a Registration Request message to the 5GC via the RAN. In response, the 5GC sends a Registration Accept message to the UE 102 via the RAN. In response to the Registration Accept message, the UE 102 can send a Registration Complete message to the 5GC via the RAN. The UE 102 successfully completes the registration procedure once the UE 102 receives the Registration Accept message or transmits the Registration Complete message.

In some implementations, the UE 102 and the CN 110 (e.g., the CN 110A or 110B) support UE radio capability signaling optimization (RACS). The UE 102 can obtain a UE radio capability identifier (ID) which indicates the UE-NR-Capability IE, the UE-EUTRA-Capability IE, and/or the UE-MRDC-Capability IE, or indicates the capabilities described above in the UE-NR-Capability IE, the UE-EUTRA-Capability IE, and/or the UE-MRDC-Capability IE. The UE 102 can be pre-configured with the UE radio capability ID in a storage module of the UE 102 or can receive the UE radio capability ID from the CN 110 (e.g., from a UE radio Capability Management Function (UCMF) of the CN 110 not shown in FIG. 1A). The CN 110 (e.g., the UCMF) stores the UE-NR-Capability IE, the UE-EUTRA-Capability IE, and/or the UE-MRDC-Capability IE, or the capabilities in the UE-NR-Capability IE, the UE-EUTRA-Capability IE, and/or the UE-MRDC-Capability IE. In cases where the UE 102 and CN 110 support RACS, the UE 102 can include, in the Attach Request message, the Tracking Area Update Request message, or the Registration Request message, the UE radio capability ID. Based on the received UE radio capability ID, the CN 110 can determine or identify the UE-NR-Capability IE, the UE-EUTRA-Capability IE, and/or the UE-MRDC-Capability IE, or the capabilities in the UE-NR-Capability IE, the UE-EUTRA-Capability IE, and/or the UE-MRDC-Capability IE. The CN 110 can then send to the RAN 105 a CN-to-BS message including the IE(s) or the capabilities. Thus, the RAN 105 may omit transmitting a UECapabilityEnquiry message to the UE 102 to obtain the IE(s) or the capabilities from the UE 102. In some implementations, the CN 110 can send to the RAN 105 a CN-to-BS message that includes a UERadioCapabilityInformation message including the IE(s) or the capabilities. In some implementations, the CN-to-BS message can be an Initial Context Setup Request message, a UE Information Transfer message, or a Downlink NAS Transport message.

The base station 104A is equipped with processing hardware 130 that can include one or more general-purpose processors such as CPUs and non-transitory computer-readable memory storing machine-readable instructions executable on the one or more general-purpose processors, and/or special-purpose processing units (e.g., an application-specific integrated circuit (ASIC) or a digital signal processor (DSP)). The processing hardware 130 in the example implementation in FIG. 1A includes a base station RRC controller 132 that is configured to manage or control RRC configurations and RRC procedures, and/or to implement the methods described below. For example, the base station RRC controller 132 can be configured to support RRC messaging associated with RRC connection establishment procedures, RRC connection resume procedures, RRC connection reestablishment procedures, RRC reconfiguration procedures, procedures for MR-DC, CA, or other suitable functionalities, and/or to support the necessary operations when the base station 104A operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units (e.g., an ASIC or a DSP). The processing hardware 140 in an example implementation includes a base station RRC controller 142 configured to manage or control RRC configurations and RRC procedures, to support the necessary operations when the base station 106A operates as an SN, and/or to implement the methods described below. In general, because a base station can operate as an MN or an SN in different scenarios, the RRC controllers 132 and 142 can implement similar sets of functions and each support both MN and SN operations. While not shown in FIG. 1A, the base stations 104B and 106B can include processing hardware similar to the processing hardware 130 and the processing hardware 140, respectively.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in the example implementation of FIG. 1A includes a UE RRC controller 152 that is configured to manage or control RRC configurations and/or RRC procedures, and/or to implement the methods described below. For example, the UE RRC controller 152 can be configured to support RRC messaging associated with RRC connection establishment procedures, RRC connection resume procedures, RRC connection reestablishment procedures, and/or procedures for MR-DC, CA, or other suitable functionalities, in accordance with any of the implementations described below. The processing hardware 150 can include an USIM controller 154 configured to manage, control, deactivate, and activate one or more USIMs for communication between the UE 102 and one or more CNs (e.g., the CN 110A and/or CN 110B). Accordingly, the processing hardware 150 also includes one or more USIMs.

More particularly, the RRC controllers 132, 142, and 152 can implement at least some of the techniques discussed below (with reference to various messaging and flow diagrams) to manage RRC configurations and UE capability information.

In operation, the UE 102 can use a radio bearer (e.g., a DRB or an SRB) that at different times terminates at a base station operating as an MN (e.g., the base station 104A) or a base station operating as an SN (e.g., the base station 106A). The UE 102 can receive a radio bearer configuration configuring the radio bearer from the MN or the SN. The UE 102 can apply one or more security keys when communicating on the radio bearer, in the uplink (from the UE 102 to a base station) and/or downlink (from a base station to the UE 102) direction. The UE 102 in some cases can use different RATs to communicate with the base stations 104A and 106A. Although the examples below may refer to specific RAT types, such as 5G NR or EUTRA, in general the techniques of this disclosure also can apply to other suitable radio access and/or core network technologies.

Figure 1B:
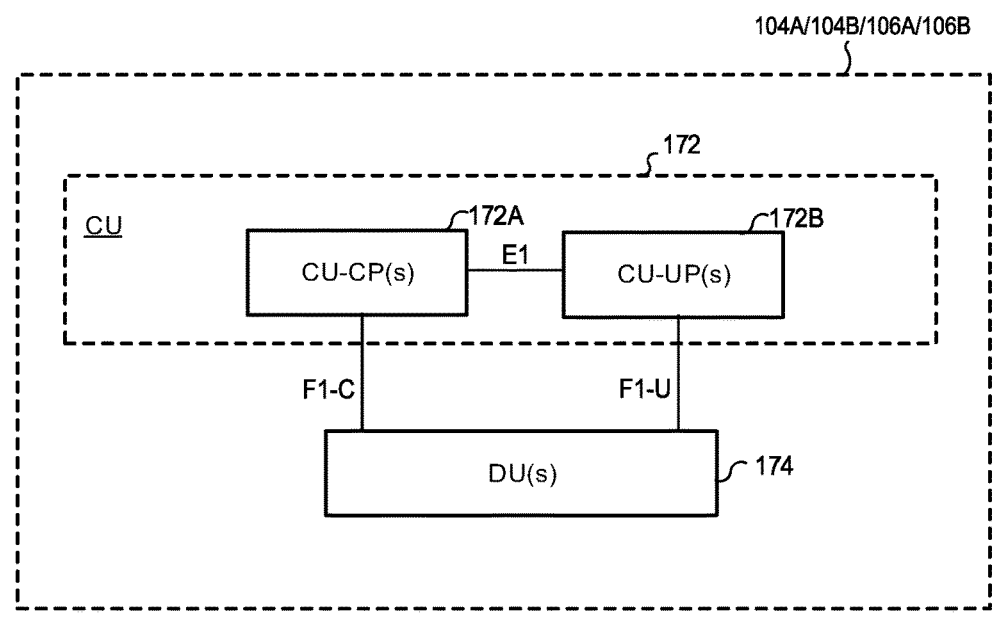
FIG. 1B is a block diagram of an example base station including a central unit (CU) and a distributed unit (DU) that can operate in the system of FIG. 1A.

FIG. 1B depicts an example distributed, or disaggregated, implementation of any one or more of the base stations 104A, 106A, 104B, 106B. In an example implementation, one or more of the base stations 104A, 106A, 104B, and 106B include(s) a central unit (CU) 172 and one or more DUs 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 106A) operates as an MN or an SN. The process hardware can also include a physical layer controller configured to manage or control one or more physical layer operations or procedures.

In some implementations, the CU 172 can include a logical node CU-CP 172A that hosts the control plane part of the Packet Data Convergence Protocol (PDCP) protocol of the CU 172. The CU 172 can also include logical node(s) CU-UP 172B that hosts the user plane part of the PDCP protocol and/or Service Data Adaptation Protocol (SDAP) protocol of the CU 172. The CU-CP 172A can transmit control information (e.g., RRC messages, F1 application protocol messages), and the CU-UP 172B can transmit data packets (e.g., SDAP PDUs or Internet Protocol packets).

The CU-CP 172A can be connected to multiple CU-UP 172B through the E1 interface. The CU-CP 172A selects the appropriate CU-UP 172B for the requested services for the UE 102. In some implementations, a single CU-UP 172B can be connected to multiple CU-CP 172A through the E1 interface. The CU-CP 172A can be connected to one or more DU 174s through an F1-C interface. The CU-UP 172B can be connected to one or more DU 174 through the F1-U interface under the control of the same CU-CP 172A. In some implementations, one DU 174 can be connected to multiple CU-UP 172B under the control of the same CU-CP 172A. In such implementations, the connectivity between a CU-UP 172B and a DU 174 is established by the CU-CP 172A using Bearer Context Management functions.

Figure 2:
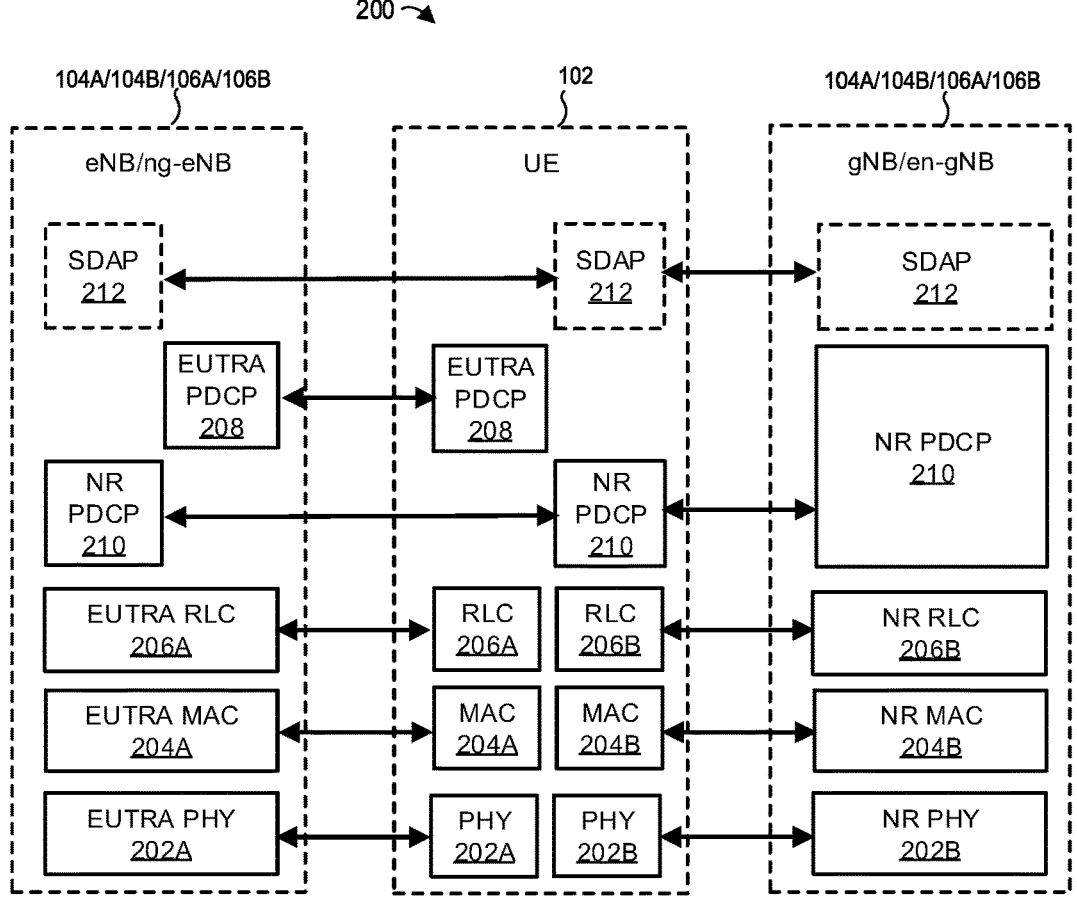
FIG. 2 is a block diagram of an example protocol stack according to which the UE of FIG. 1A can communicate with base stations.

FIG. 2 illustrates, in a simplified manner, an example protocol stack 200 according to which the UE 102 can communicate with an eNB/ng-eNB or a gNB (e.g., one or more of the base stations 104A, 104B, 106A, 106B).

In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to an EUTRA PDCP sublayer 208 and, in some cases, to an NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides data transfer services to the NR PDCP sublayer 210. The NR PDCP sublayer 210 in turn can provide data transfer services to Service Data Adaptation Protocol (SDAP) 212 or a radio resource control (RRC) sublayer (not shown in FIG. 2). The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP 210 over EUTRA RLC 206A, and SDAP sublayer 212 over the NR PDCP sublayer 210.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 can be SDAP PDUs, Internet Protocol (IP) packets or Ethernet packets.

In scenarios where the UE 102 operates in EN-DC with the base station 104A operating as an MeNB and the base station 106A operating as an SgNB, the wireless communication system 100 can provide the UE 102 with an MN-terminated bearer that uses EUTRA PDCP sublayer 208, or an MN-terminated bearer that uses NR PDCP sublayer 210. The wireless communication system 100 in various scenarios can also provide the UE 102 with an SN-terminated bearer, which uses only the NR PDCP sublayer 210. The MN-terminated bearer can be an MCG bearer or a split bearer. The SN-terminated bearer can be an SCG bearer or a split bearer. The MN-terminated bearer can be an SRB (e.g., SRB1 or SRB2) or a DRB. The SN-terminated bearer can be an SRB (e.g., SRB3) or a DRB. In scenarios where the UE 102 equipped with two USIMs performs two registration procedures and simultaneously connects to the base station 104A operating as an MeNB and the base station 106A operating as an MgNB, the MeNB 104A can provide the UE 102 with an MN-terminated bearer that uses EUTRA PDCP sublayer 208 and the MgNB 106A can provide the UE 102 with an MN-terminated bearer that uses NR PDCP sublayer 210.

Below the PDCP layer, any of the PHY, MAC, and RLC layers may be generically referenced as a lower layer or lower layers (e.g., PHY 202A/202B, MAC 204A/204B, and/or RLC 206A/206B). While managing connectivity between a base station 104A, 106A and a UE 102, one or more of these lower layers may be suspended, released, resumed, reset, or re-established.

Next, several example scenarios in which the UE 102 registered with a first CN via a first RAN and a second CN via a second RAN provides UE capability information to the two RANs are discussed with reference to FIGS. 3-5. Generally speaking, events in FIGS. 3-5 that are similar are labeled with similar reference numbers (e.g., event 326 is similar to event 426), with differences discussed below where appropriate. With the exception of the differences shown in the figures and discussed below, any of the alternative implementations discussed with respect to a particular event (e.g., for messaging and processing) may apply to events labeled with similar reference numbers in other figures.

Figure 3:
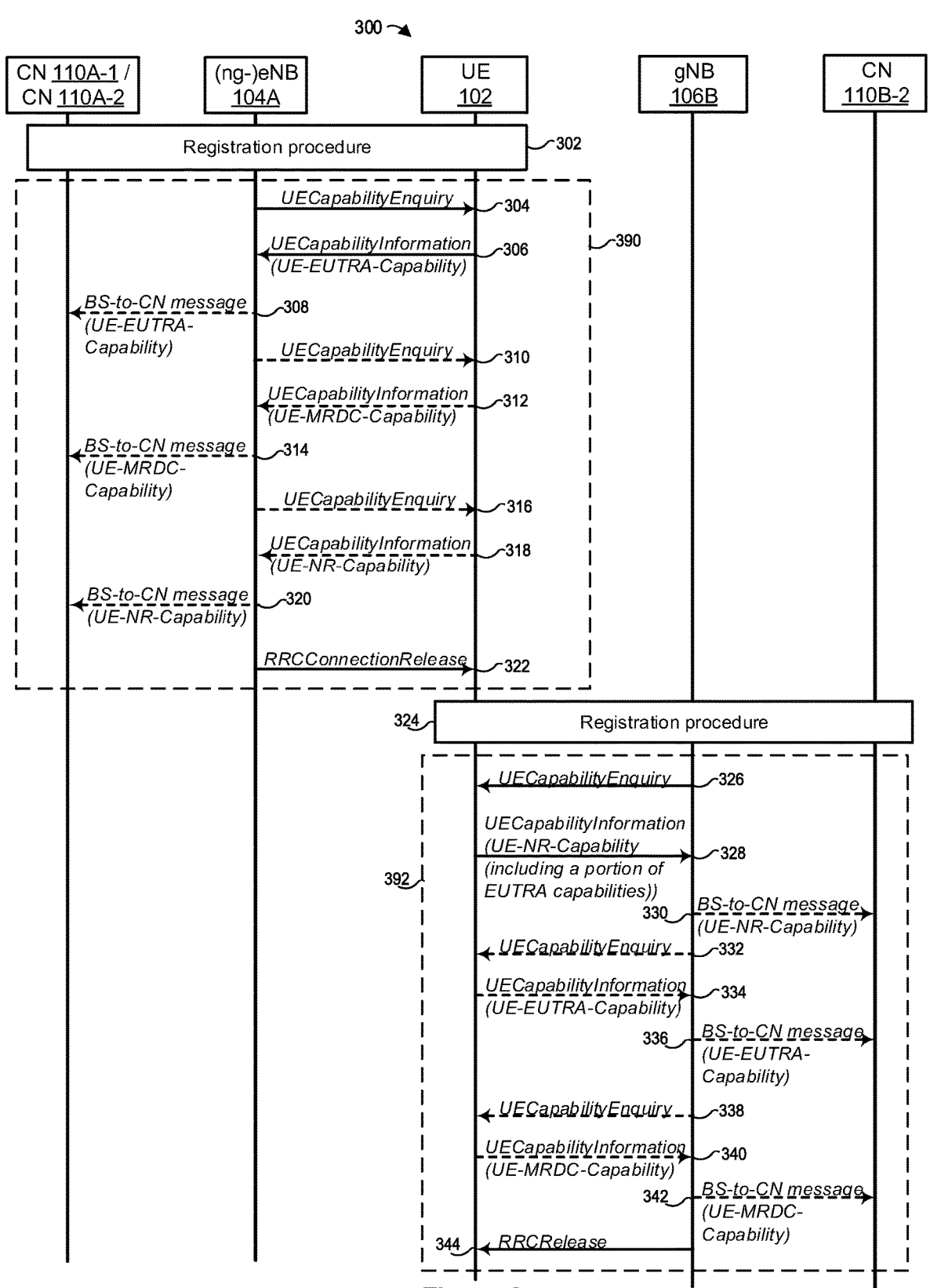
FIG. 3 is an example message sequence in which a UE provides UE capability information to an Evolved Universal Terrestrial Radio Access Network (EUTRAN) included in a first cellular network and to a next-generation Radio Access Network (NG-RAN) included in a second cellular network.

Referring first to FIG. 3, in a scenario 300, the RAN 105A operates as an EUTRAN connected to the CN 110A, which can be the CN 110A-1 (i.e., an EPC) or the CN 110A-2 (i.e., a 5GC). The RAN 105B operates as an NG-RAN connected to the CN 110B-2. The base station 104A operates as an (ng-)eNB in the EUTRAN 105A, and the base station 106B operates as a gNB in the NG-RAN 105B. Initially, the UE 102 performs 302 a first registration procedure with the CN 110A via the (ng-)eNB 104A (or, more generally, via the EUTRAN 105A to which the (ng-)eNB 104A belongs) using a first USIM. In some implementations, the UE 102 performs an RRC connection establishment procedure to transition to a connected state (e.g., RRC CONNECTED) to perform the first registration procedure. If the UE 102 successfully completes the first registration procedure, the UE 102 has registered with the CN 110A. During or after the first registration procedure, the (ng-) eNB 104A performs a first UE Capability Transfer procedure by sending 304 a first UECapabilityEnquiry message to the UE 102 to request EUTRA capabilities from the UE 102 (e.g., the (ng-)eNB 104A can include an "eutra" indication in the UECapabilityEnquiry). In response, the UE 102 sends 306 a first UECapabilityInformation message including a first UE-EUTRA-Capability IE to the (ng-)eNB 104A. In the first UE-EUTRA-Capability IE, the UE 102 can include EUTRA capabilities of the UE 102 and optionally include a portion of NR capabilities. In some implementations, the UE 102 may omit the portion of NR capabilities in the first UE-EUTRA-Capability IE if the UE 102 does not support NR for communication with the CN 110A using the first USIM, or does not support NR when operating in a dual registration mode or with dual active USIMs.

As discussed above with reference to FIG. 1A, the EUTRA capabilities can include a UE category, PDCP capabilities, physical layer capabilities, RF capabilities, measurement capabilities, and/or mobility capabilities. The portion of NR capabilities can include one or more of: NR frequency bands that the UE 102 supports for NR standalone node, NR frequency bands for EN-DC that the UE 102 supports, an indication that the UE 102 supports EN-DC, an indication that the UE 102 supports NG-EN-DC, an indication that the UE 102 supports NR standalone mode, an indication that the UE 102 supports event B2 for NR measurement reporting, NR PDCP capabilities, IMS voice over NR capability, or one or more handover to NR capabilities, such as handover to NR frequency division duplex (FDD) frequency range 1 (FR1) and/or handover to time division duplex (TDD) FR1.

After receiving the first UE-EUTRA-Capability IE, in some implementations, the (ng-)eNB 104A sends 308 a first BS-to-CN message including the first UE-EUTRA-Capability IE to the CN 110A. The CN 110A stores the first UE-EUTRA-Capability IE for the UE 102. The next time that the UE 102 connects to the CN 110A via the EUTRAN 105A (e.g., the (ng-)eNB 104A or 106A), the CN 110A can send a first CN-to-BS message including the first UE-EUTRA-Capability IE to the EUTRAN 105A. Thus, the EUTRAN 105A does not need to perform a UE Capability Transfer procedure to obtain the first UE-EUTRA-Capability IE from the UE 102. In some implementations, the first CN-to-BS message can be an Initial Context Setup Request message, a UE Information Transfer message, or a Downlink NAS Transport message.

In some implementations, during or after the first registration procedure, the (ng-) eNB 104A performs a second UE Capability Transfer procedure by sending 310 a second UECapabilityEnquiry message to the UE 102 to request MR-DC capabilities from the UE 102 (e.g., the (ng-)eNB 104A can include an "eutra-nr indication" in the UECapabilityEnquiry message). In response, the UE 102 sends 312 a second UECapabilityInformation message including a first UE-MRDC-Capability IE to the (ng-) eNB 104A. The (ng-)eNB 104A can determine whether to perform the second UE Capability Transfer procedure based on the first UE-EUTRA-Capability IE that the UE 102 transmits 306. For example, if the portion of NR capabilities is included in the first UE-EUTRA-Capability IE, the portion of NR capabilities can indicate (NG-)EN-DC capabilities of the UE 102 (e.g., the NR capabilities can include an indication of that UE 102 supports EN-DC and/or NG-EN-DC, NR frequency bands for EN-DC, and/or an indication of UE support for handover to (NG-)EN-DC from NR, such as an nr-HO-ToEN-DC-r16 field). If the portion of NR capabilities indicates that the UE 102 supports (NG-)EN-DC, then the (ng-) eNB 104A can determine to request more details regarding the UE's MR-DC capabilities. Thus, in some implementations, the (ng-)eNB 104A performs the second UE Capability Transfer procedure if the portion of NR capabilities received in the first UE-EUTRA-Capability IE includes (NG-)EN-DC capabilities, and does not perform the second UE Capability Transfer procedure if the portion of NR capabilities does not include (NG-)EN-DC capabilities or indicates that the UE 102 does not support (NG-)EN-DC.

After receiving the first UE-MRDC-Capability IE, the (ng-)eNB 104A can send 314 a second BS-to-CN message including the first UE-MRDC-Capability IE to the CN 110A. The CN 110A stores the first UE-MRDC-Capability IE for the UE 102. The next time that the UE 102 connects to the CN 110A via the EUTRAN 105A (e.g., the (ng-)eNB 104A or 106A), the CN 110A can send a second CN-to-BS message including the first UE-MRDC-Capability IE to the EUTRAN 105A. Thus, the EUTRAN 105A does not need to perform a UE Capability Transfer procedure to obtain the first UE-MRDC-Capability IE from the UE 102. In some implementations, the second CN-to-BS message can be an Initial Context Setup Request message, a UE Information Transfer message, or a Downlink NAS Transport message. Alternatively, the CN 110A can include the first UE-MRDC-Capability IE in the first CN-to-BS message.

In some implementations, during or after the first registration procedure, the (ng-) eNB 104A can perform a third UE Capability Transfer procedure by sending 316 a third UECapabilityEnquiry message to the UE 102 to request NR capabilities from the UE 102 (e.g., by including an "nr" indication in the UECapabilityEnquiry message). In response, the UE 102 sends 318 a third UECapabilityInformation message including a first UE-NR-Capability IE to the (ng-)eNB 104A. In the first UE-NR-Capability IE, the UE 102 can include NR capabilities of the UE 102, and can optionally include a portion of EUTRA capabilities. For example, the NR capabilities include PDCP capabilities, RLC capabilities, MAC capabilities, physical layer capabilities, radio frequency (RF) capabilities, measurement and mobility capabilities, feature set(s) and/or feature set combination(s). In another example, the portion of EUTRA capabilities includes EUTRA frequency bands. In yet another example, the portion of EUTRA capabilities includes an indication that the supports NR-EUTRA dual connectivity (NE-DC), an mfbi-EUTRA field, a multiNS-Pmax-EUTRA field, an rs-SINR-MeasEUTRA field, and/or an nr-HO-ToEN-DC-r16 field.

After receiving the first UE-NR-Capability IE, the (ng-) eNB 104A can send 320 a third BS-to-CN message including the first UE-NR-Capability IE to the CN 110A. The CN 110A stores the first UE-NR-Capability IE for the UE 102. The next time that the UE 102 connects to the CN 110A via the EUTRAN 105A (e.g., the (ng-)eNB 104A or 106A), the CN 110A can send a third CN-to-B S message including the first UE-NR-Capability IE to the EUTRAN 105A. Thus, the EUTRAN 105A does not need to perform a UE Capability Transfer procedure to obtain the first UE-NR-Capability IE from the UE 102. In some implementations, the third CN-to-BS message can be an Initial Context Setup Request message, a UE Information Transfer message, or a Downlink NAS Transport message. Alternatively, the CN 110A can include the first UE-NR-Capability IE in the first CN-to-B S message.

Similar to the second UE Capability Transfer procedure, the (ng-)eNB 104A can determine whether to perform the third UE Capability Transfer procedure based on the first UE-EUTRA-Capability IE that the UE transmits 306. If the portion of NR capabilities in the first UE-EUTRA-Capability IE indicates that the UE 102 supports NR, then the (ng-)eNB 104A can determine to request more details regarding the UE's NR capabilities. For example, if the UE-EUTRA-Capability IE includes a portion of NR capabilities that indicates that the UE 102 supports NR, then the (ng-)eNB 104A determines to perform the third UE Capability Transfer procedure. Otherwise, the (ng-)eNB 104A can refrain from performing the third UE Capability Transfer procedure. The first UE-NR-Capability IE may indicate additional UE capabilities and/or more details related to the UE NR capabilities than indicated in the portion of NR capabilities in the first UE-EUTRA-Capability IE.

After obtaining the capabilities of the UE 102 as described above, the (ng-)eNB 104A can send 322 an RRCConnectionRelease message to the UE 102 to command the UE 102 to enter an inactive state (e.g., RRC_IDLE or RRC_INACTIVE state). In response to the RRCConnectionRelease message, the UE 102 transitions to the inactive state from the connected state. Collectively, events 304-322 can be referred to as a UE capability obtaining procedure 390.

In some implementations, the (ng-)eNB 104A can combine any two or three of the first, second, and third UE Capability Transfer procedures. For example, the (ng-)eNB 104A can transmit 310 to the UE 102 the second UECapabilityEnquiry message including the "eutra-nr" and "nr" indications, and in response, the UE 102 transmits 312 to the (ng-)eNB 104A the second UECapabilityInformation message including the first UE-MRDC-Capability IE and the first UE-NR-Capability IE. Thus, the (ng-)eNB 104A does not perform the third UE Capability Transfer procedure. In this example, the (ng-)eNB 104A can include the first UE-MRDC-Capability IE and the first UE-NR-Capability IE in the second BS-to-CN message at event 314. Thus, the (ng-)eNB 104A does not send 320 the third BS-to-CN message. In such implementations, the (ng-)eNB 104A can include the "eutra-nr" and "nr" indications in the second UECapabilityEnquiry message if the portion of NR capabilities received in the first UE-EUTRA-Capability IE includes (NG-)EN-DC capabilities.

In some implementations, the (ng-)eNB 104A can include the first UE-EUTRA-Capability IE with the first UE-MRDC-Capability IE in the second BS-to-CN message at event 314. Thus, the (ng-)eNB 104A does not send 308 the first BS-to-CN message. In other implementations, the (ng-)eNB 104A can include the first UE-EUTRA-Capability IE and the first UE-MRDC-Capability IE with the first UE-NR-Capability IE in the third B S-to-CN message at event 320. Thus, the (ng-)eNB 104A does not send 308 the first BS-to-CN message and does not send 314 the second BS-to-CN message. In yet other implementations, the (ng-)eNB 104A can include the first UE-MRDC-Capability IE with the first UE-NR-Capability IE in the third BS-to-CN message at event 320. Thus, the (ng-)eNB 104A does not send 314 the second BS-to-CN message. In yet other implementations, the (ng-)eNB 104A can include the first UE-EUTRA-Capability IE with the first UE-NR-Capability IE in the third BS-to-CN message at event 320. Thus, the (ng-)eNB 104A does not send 308 the first BS-to-CN message.

In some implementations, the CN 110A can send to the EUTRAN 105A a single CN-to-BS message including the first UE-EUTRA-Capability IE, the first UE-MRDC-Capability IE and/or the first UE-NR-Capability IE the next time that the UE 102 connects to the CN 110A via the EUTRAN 105A. In other words, the CN 110A can combine the first, second and/or third CN-to-BS message into the single CN-to-BS message.

After the UE 102 completes the first registration procedure, the UE 102 can use the second USIM to perform 324 a second registration procedure with the CN 110B-2 via the gNB 106B (or, more generally, via the NG-RAN 105B to which the gNB 106B belongs). In some implementations, the first and second USIMs belong to different operators. In other implementations, the first USIM includes a first home PLMN ID and the second USIM includes a second home PLMN ID different from the first home PLMN ID. In yet other implementations, the first and second USIMs include the same home PLMN IDs. In some implementations, the first USIM includes a first (home) SNPN ID and the second USIM includes a second (home) SNPN ID different from the first (home) SNPN ID. In yet other implementations, the first and second USIMs include the same home SNPN IDs. In yet other implementations, one of the first and second USIMs includes a (home) SNPN ID and the other does not include a (home) SNPN ID.

During or after the second registration procedure, the gNB 106B can perform a fourth UE Capability Transfer procedure by sending 326 a fourth UECapabilityEnquiry message to the UE 102 to request NR capabilities from the UE 102 (e.g., by including an "nr" indication in the UECapabilityEnquiry message). In response, the UE 102 sends 328 a fourth UECapabilityInformation message including a second UE-NR-Capability IE to the gNB 106B. In the second UE-NR-Capability IE, the UE 102 includes NR capabilities of the UE 102 and a portion of EUTRA capabilities. For example, the NR capabilities include PDCP capabilities, RLC capabilities, MAC capabilities, physical layer capabilities, radio frequency (RF) capabilities, measurement and mobility capabilities, feature set(s) and/or feature set combination(s). In another example, the portion of EUTRA capabilities includes EUTRA frequency bands. In yet another example, the portion of EUTRA capabilities includes an indication that the UE 102 supports NR-EUTRA dual connectivity (NE-DC), an mfbi-EUTRA field, a multiNS-Pmax-EUTRA field, an rs-SINR-MeasEUTRA field, and/or an nr-HO-ToEN-DC-r16 field.

After receiving the second UE-NR-Capability IE, the gNB 106B can send 330 a fourth BS-to-CN message including the second UE-NR-Capability IE to the CN 110B-2. The CN 110B-2 stores the second UE-NR-Capability IE for the UE 102, so that the next time that the UE 102 connects to the CN 110B-2 via the NG-RAN 105B (e.g., the gNB 104B or 106B), the CN 110B-2 can send a fourth CN-to-BS message including the second UE-NR-Capability IE to the NG-RAN 105B. Thus, the NG-RAN 105B does not need to perform a UE Capability Transfer procedure to obtain the second UE-NR-Capability IE from the UE 102. In some implementations, the fourth CN-to-BS message can be an Initial Context Setup Request message, a UE Information Transfer message, or a Downlink NAS Transport message.

In some implementations, during or after the second registration procedure, the gNB 106B can perform a fifth UE Capability Transfer procedure by sending 332 a fifth UECapabilityEnquiry message the UE 102 to request EUTRA capabilities from the UE 102 (e.g., by including an "eutra" indication in the UECapabilityEnquiry message). In response, the UE 102 sends 334 a fifth UECapabilityInformation message including a second UE-EUTRA-Capability IE to the gNB 106B. In the second UE-EUTRA-Capability IE, the UE 102 can include EUTRA capabilities of the UE 102 and can optionally include a portion of NR capabilities. For example, the EUTRA capabilities include UE category, PDCP capabilities, physical layer capabilities, RF capabilities, measurement capabilities and/or mobility capabilities. The portion of NR capabilities can include one or more of: NR frequency bands that the UE 102 supports for NR standalone node, NR frequency bands for EN-DC that the UE 102 supports, an indication that the UE 102 supports EN-DC, an indication that the UE 102 supports NG-EN-DC, an indication that the UE 102 supports NR standalone mode, an indication that the UE 102 supports event B2 for NR measurement reporting, NR PDCP capabilities, IMS voice over NR capability, or one or more handover to NR capabilities, such as handover to NR frequency division duplex (FDD) frequency range 1 (FR1) and/or handover to time division duplex (TDD) FR1.

After receiving the second UE-EUTRA-Capability IE, the gNB 106B can send 336 a fifth BS-to-CN message including the second UE-EUTRA-Capability IE to the CN 110B-2.

The CN 110B-2 stores the second UE-EUTRA-Capability IE for the UE 102, so that the next time that the UE 102 connects to the CN 110B-2 via the NG-RAN 105B (e.g., the gNB 104B or 106B), the CN 110B-2 can send a fifth CN-to-BS message including the second UE-EUTRA-Capability IE to the NG-RAN 105B. Thus, the NG-RAN 105B does not need to perform a UE Capability Transfer procedure to obtain the second UE-EUTRA-Capability IE from the UE 102. In some implementations, the fifth CN-to-BS message can be an Initial Context Setup Request message, a UE Information Transfer message, or a Downlink NAS Transport message. Alternatively, the CN 110B-2 can include the second UE-EUTRA-Capability IE in the fourth CN-to-BS message.

In some implementations, the gNB 106B determines to perform the fifth UE Capability Transfer procedure in response to the portion of EUTRA capabilities received in the second UE-NR-Capability IE. For example, if the portion of EUTRA capabilities indicates that the UE 102 supports EUTRA, then the gNB 106B can determine to request more details regarding the UE's EUTRA capabilities. The second UE-EUTRA-Capability IE may indicate additional UE capabilities and/or more details related to the UE EUTRA capabilities than indicated in the portion of EUTRA capabilities included in the second UE-NR-Capability IE. If the second UE-NR-Capability IE does not include the portion of EUTRA capabilities, the gNB 106B does not perform the fifth UE Capability Transfer procedure.

In some implementations, during or after the second registration procedure, the gNB 106B performs a sixth UE Capability Transfer procedure by sending 338 a sixth UECapabilityEnquiry message to the UE 102 to request MR-DC capabilities from the UE 102 (e.g., by including an "eutra-nr" indication in the UECapabilityEnquiry message). In response, the UE 102 sends 340 a sixth UECapabilityInformation message including a second UE-MRDC-Capability IE to the gNB 106B. In some implementations, the UE 102 can include, in the second UE-NR-Capability IE, (NG-)EN-DC and/or NE-DC capabilities of the UE 102 (e.g., an indication that the UE 102 supports NE-DC and/or an indication that the UE 102 supports handover to (NG-)EN-DC from NR (e.g., an nr-HO-ToEN-DC-r16 field)). In some implementations, the gNB 106B determines to perform the sixth UE Capability Transfer procedure if the second UE-NR-Capability IE includes the (NG-)EN-DC and/or NE-DC capabilities of the UE 102. If the second UE-NR-Capability IE does not include capabilities related to (NG-)EN-DC and/or NE-DC, the gNB 106B does not perform the sixth UE Capability Transfer procedure. In such cases, after the UE 102 hands over to the EUTRAN 105A from the NG-RAN 105B, a base station of the EUTRAN 105A (e.g., the (ng-)eNB 104A) may perform a UE Capability Transfer with the UE 102 to obtain MR-DC capabilities from the UE 102, similar to the second UE Capability Transfer procedure.

In other implementations, the UE 102 can include, in the second UE-EUTRA-Capability IE, (NG-)EN-DC capabilities of the UE 102 (e.g., an indication that the UE 102 supports EN-DC, an indication that the UE 102 supports NG-EN-DC, NR frequency bands for EN-DC, and/or an indication of UE support of handover to (NG-)EN-DC from NR (e.g., a nr-HO-ToEN-DC-r16 field)). In some implementations, the gNB 106B determines to perform the sixth UE Capability Transfer procedure if the portion of NR capabilities received in the second UE-EUTRA-Capability IE includes the (NG-)EN-DC capabilities. If the second UE-EUTRA-Capability IE does not include capabilities related to (NG-)EN-DC, the gNB 106B does not perform the sixth UE Capability Transfer procedure.

After receiving the second UE-MRDC-Capability IE, the gNB 106B can send 342 a sixth BS-to-CN message including the second UE-MRDC-Capability IE to the CN 110B-2. The CN 110B-2 stores the second UE-MRDC-Capability IE for the UE 102, so that the next time that the UE 102 connects to the CN 110B-2 via the NG-RAN 105B (e.g., the gNB 104B or 106B), the CN 110B-2 can send a sixth CN-to-BS message including the second UE-MRDC-Capability IE to the NG-RAN 105B. Thus, the NG-RAN 105B does not need to perform a UE Capability Transfer procedure to obtain the second UE-MRDC-Capability IE from the UE 102. In some implementations, the sixth CN-to-BS message can be an Initial Context Setup Request message, a UE Information Transfer message, or a Downlink NAS Transport message. Alternatively, the CN 110B-2 can include the second UE-MRDC-Capability IE in the fourth CN-to-BS message as further described below.

After obtaining the capabilities of the UE 102 as described above, the gNB 106B can send 344 an RRCRelease message to the UE 102 to command the UE 102 to enter an inactive state (e.g., RRC_IDLE or RRC_INACTIVE state). In response to the RRCRelease message, the UE 102 transitions to the inactive state from the connected state. Collectively, events 326-344 can be referred to as a UE capability obtaining procedure 392.

In some implementations, the gNB 106B can combine any two or three of the fourth, fifth, and sixth UE Capability Transfer procedures. For example, the gNB 106B can transmit 332 to the UE 102 the fifth UECapabilityEnquiry message including the "eutra-nr" and "eutra" indications, and in response, the UE 102 transmits 334 to the gNB 106B the fifth UECapabilityInformation message including the second UE-MRDC-Capability IE and the second UE-EUTRA-Capability IE. Thus, the gNB 106B does not perform the sixth UE Capability Transfer procedure. In this example, the gNB 106B can include the second UE-MRDC-Capability IE and the second UE-EUTRA-Capability IE in the fifth BS-to-CN message at event 336. Thus, the gNB 106B does not send 342 the sixth BS-to-CN message. In such implementations, the gNB 106B can include the "eutra-nr" and "nr" indications in the second UECapabilityEnquiry message if the second UE-NR-Capability IE includes the (NG-) EN-DC and/or NE-DC capabilities of the UE 102.

In some implementations, the gNB 106B can include the second UE-NR-Capability IE with the second UE-EUTRA-Capability IE in the fifth BS-to-CN message at event 336. Thus, the gNB 106B does not send 330 the fourth BS-to-CN message. In other implementations, the gNB 106B can include the second UE-NR-Capability IE and the second UE-MRDC-Capability IE with the second UE-EUTRA-Capability IE in the sixth BS-to-CN message at event 342. Thus, the gNB 106B does not send 330 the fourth BS-to-CN message and does not send 336 the fifth BS-to-CN message. In yet other implementations, the gNB 106B can include the second UE-MRDC-Capability IE with the second UE-EUTRA-Capability IE in the sixth BS-to-CN message at event 342. Thus, the gNB 106B does not send 336 the fifth BS-to-CN message. In yet other implementations, the gNB 106B can include the second UE-NR-Capability IE with the second UE-EUTRA-Capability IE in the sixth BS-to-CN message at event 342. Thus, the NG-RAN 105B does not send 330 the fourth BS-to-CN message.

In some implementations, the CN 110B-2 can send to the NG-RAN 105B a single CN-to-BS message including the second UE-NR-Capability IE, the second UE-EUTRA-Capability IE and/or the second UE-MRDC-Capability IE when the UE 102 next time connects to the CN 110B-2 via the NG-RAN 105B. In other words, the CN 110B-2 can combine the fourth, fifth and/or sixth CN-to-BS message as the single CN-to-BS message.

Depending on the implementation, the first and second UE-EUTRA-Capability IEs can be identical or different. In some implementations, at least a portion of the EUTRA capabilities in the first and second UE-EUTRA-Capability IEs are identical. In such implementations, the UE 102 may share hardware components and/or software components required by identical EUTRA capabilities when the UE 102 has registered with the CN 110A and the CN 110B-2. For example, some or all of supported EUTRA frequency band (s) and/or EUTRA band combination(s) in the first and second UE-EUTRA-Capability IEs can be identical. In another example, some or all of EUTRA frequency band(s) and/or EUTRA band combination(s) included in one of the first and second UE-EUTRA-Capability IEs are not included in the other.

Likewise, depending on the implementation, the first and second UE-NR-Capability IEs can be identical or different. In some implementations, at least a portion of the NR capabilities in the first and second UE-NR-Capability IEs are identical. In such implementations, the UE 102 may share hardware components and/or software components required by identical NR capabilities when the UE 102 has registered with the CN 110A and the CN 110B-2. For example, some or all of supported NR frequency band(s) and/or NR band combination(s) in the first and second UE-NR-Capability IEs can be identical. In another example, some or all of NR frequency band(s) and/or NR band combination(s) included in one of the first and second UE-NR-Capability IEs are not included in the other.

Further, depending on the implementation, the first and second UE-MRDC-Capability IEs can be identical or different. In some implementations, at least a portion of the MR-DC capabilities in the first and second UE-MRDC-Capability IEs are identical. In such implementations, the UE 102 may share hardware components and/or software components required by identical MR-DC capabilities when the UE 102 has registered with the CN 110A and the CN 110B-2. For example, some or all of supported MR-DC (e.g., (NG-)EN-DC or NE-DC) band combination(s) in the first and second UE-MRDC-Capability IEs can be identical. In another example, some or all of MR-DC band combination(s) included in one of the first and second UE-EUTRA-Capability IEs are not included in the other.

In summary, the UE-EUTRA-Capability IE that the UE 102 sends 306 to the EUTRAN 105A can be the same or different to the UE-EUTRA-Capability IE that the UE 102 sends 334 to the NG-RAN 105B, the UE-NR-Capability IE that the UE 102 sends 318 to the EUTRAN 105A can be the same or different to the UE-NR-Capability IE that the UE 102 sends 328 to the NG-RAN 105B, and the UE-MRDC-Capability IE that the UE 102 sends 312 to the EUTRAN 105A can be the same or different to the UE-MRDC-Capability IE that the UE 102 sends 340 to the NG-RAN 105B. In other words, the UE capabilities that the UE supports for communicating with the EUTRAN 105A may be different than the UE capabilities that the UE supports for communicating with the NG-RAN 105B.

For clarity, FIG. 3 illustrates the first registration procedure 302 and the UE capability obtaining procedure 390 as occurring before the second registration procedure 324 and the UE capability obtaining procedure 392. However, the ordering of these events may vary by implementation. For example, in one implementation, the UE 102 performs the second registration procedure 324 before the first registration procedure 302. The UE 102 can then perform the UE capability obtaining procedure 392 after the second registration procedure 324 and before the first registration procedure 302, or after the first registration procedure 302. As another example, if the UE 102 is capable of simultaneous active connections with the EUTRAN 105A and the NG-RAN 105B, the UE 102 can perform the UE capability obtaining procedure 390 and the UE capability obtaining procedure 392 in parallel (provided the UE 102 has registered with both the CN 110A and the CN 110B-2). For instance, the UE 102 can register with both the CN 110A and the CN 110B-2, and then send 306 the first EUTRA-Capability IE and send 328 the UE-NR-Capability IE to the EUTRAN 105A and the NG-RAN 105B, respectively.

Figures 4, 5:
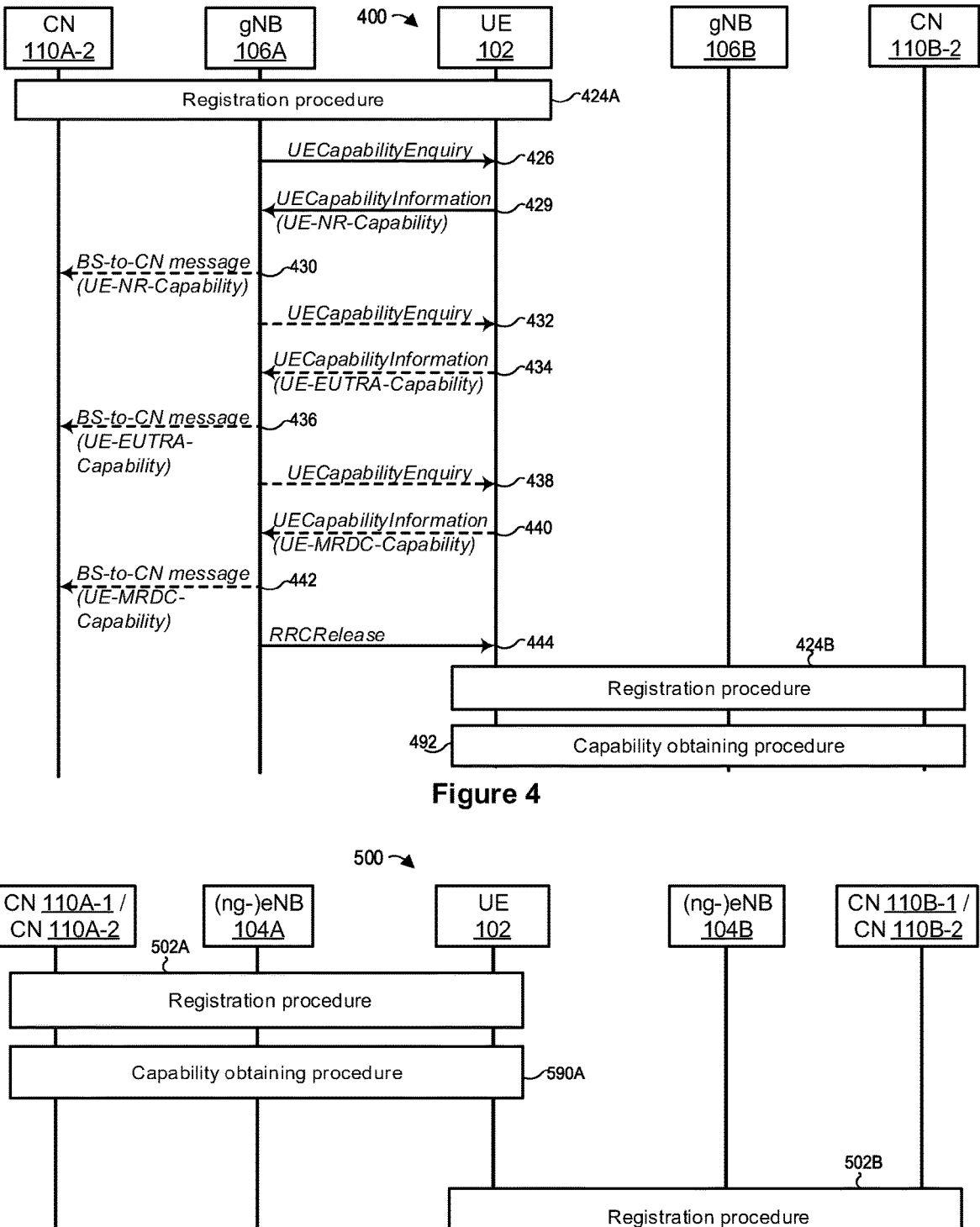
FIG. 4 is an example message sequence in which a UE provides UE capability information to a first NG-RAN included in a first cellular network and to a second NG-RAN included in a second cellular network.
FIG. 5 is an example message sequence in which a UE provides UE capability information to a first EUTRAN included in a first cellular network and to a second EUTRAN included in a second cellular network.

Turning to FIG. 4, a scenario 400 is similar to the scenario 300, except that both RANs (i.e., a first RAN 105A and second RAN 105B) are NG-RANs. The RAN 105A operates as an NG-RAN connected to the CN 110A-2, and the RAN 105B operates as an NG-RAN connected to the CN 110B-2. The base station 106A operates as a gNB in the NG-RAN 105A, and the base station 106B operates as a gNB in the NG-RAN 105B. Initially, the UE 102 performs 424A a first registration procedure with the CN 110A-2 via the gNB 106A (or, more generally, via the NG-RAN 105A to which the gNB 106A belongs) using a second USIM, similar to the registration procedure 324. The events 426, 430, 432, 434, 436, 438, 440, 442, and 444 are similar to the events 326, 330, 332, 334, 336, 338, 340, 342, and 344, respectively. In response to receiving 426 the UECapabilityEnquiry message, the UE 102 sends 429 a UECapabilityInformation message including a UE-NR-Capability IE to the gNB 106A. Optionally, the UE 102 can include a portion of EUTRA capabilities in the UE-NR-Capability IE that the UE 102 transmits 429, similar to the UE-NR-Capability IE that the UE 102 transmits 328.

The UE 102 also performs 424B a second registration procedure with the CN 110B-2 and performs 492 a UE capability obtaining procedure with the gNB 106B and CN 110B-2, similar to the UE capability obtaining procedure 392. The UE-NR-Capability IE that the UE 102 sends 429 to the gNB 106A may be different or identical to the UE-NR-Capability IE that the UE 102 sends to the gNB 106B during the capability obtaining procedure 492. Further, if the UE 102 includes a portion of EUTRA capabilities in the UE-NR-Capability IE that the UE 102 transmits 429, the portion of EUTRA capabilities can be different or identical to the portion of EUTRA capabilities that the UE 102 includes in the UE-NR-Capability IE that the UE 102 sends during the capability obtaining procedure 492.

Turning to FIG. 5, a scenario 500 is similar to the scenario 300, except that both RANs (i.e., a first RAN 105A and a second RAN 105B) are EUTRANs. The RAN 105A operates as an EUTRAN connected to a CN 110A, which can be the CN 110A-1 (i.e., an EPC) or the CN 110A-2 (i.e., the 5GC), and the RAN 105B operates as an EUTRAN connected to a CN 110B, which can be the CN 110B-1 or the CN 110B-2. The base station 104A operates as an (ng-)eNB in the EUTRAN 105A, and the base station 104B operates as an (ng-)eNB in the EUTRAN 105B. The UE 102 performs 502A a first registration procedure with the CN 110A and a UE capability obtaining procedure 590A with the (ng-) eNB 104A and the CN 110A. The UE 102 also performs 502B a second registration procedure with the CN 110B and a UE capability obtaining procedure 590B with the (ng-) eNB 104B and the CN 110B. During the UE capability obtaining procedure 590A, the UE 102 provides a first UE-EUTRA-Capability IE to the (ng-)eNB 104A, which optionally can include a first portion of NR capabilities. Likewise, during the UE capability obtaining procedure 590B, the UE 102 provides a second UE-EUTRA-Capability IE to the (ng-) eNB 104B, which optionally includes a second portion of NR capabilities. The first and second UE-EUTRA-Capability IEs can be the same or different, and the first and second portion of NR capabilities can be the same or different.

FIGS. 6-17 are flow diagrams depicting methods that a UE (e.g., the UE 102) equipped with multiple USIMs can perform for managing UE capability information.

Figure 6:
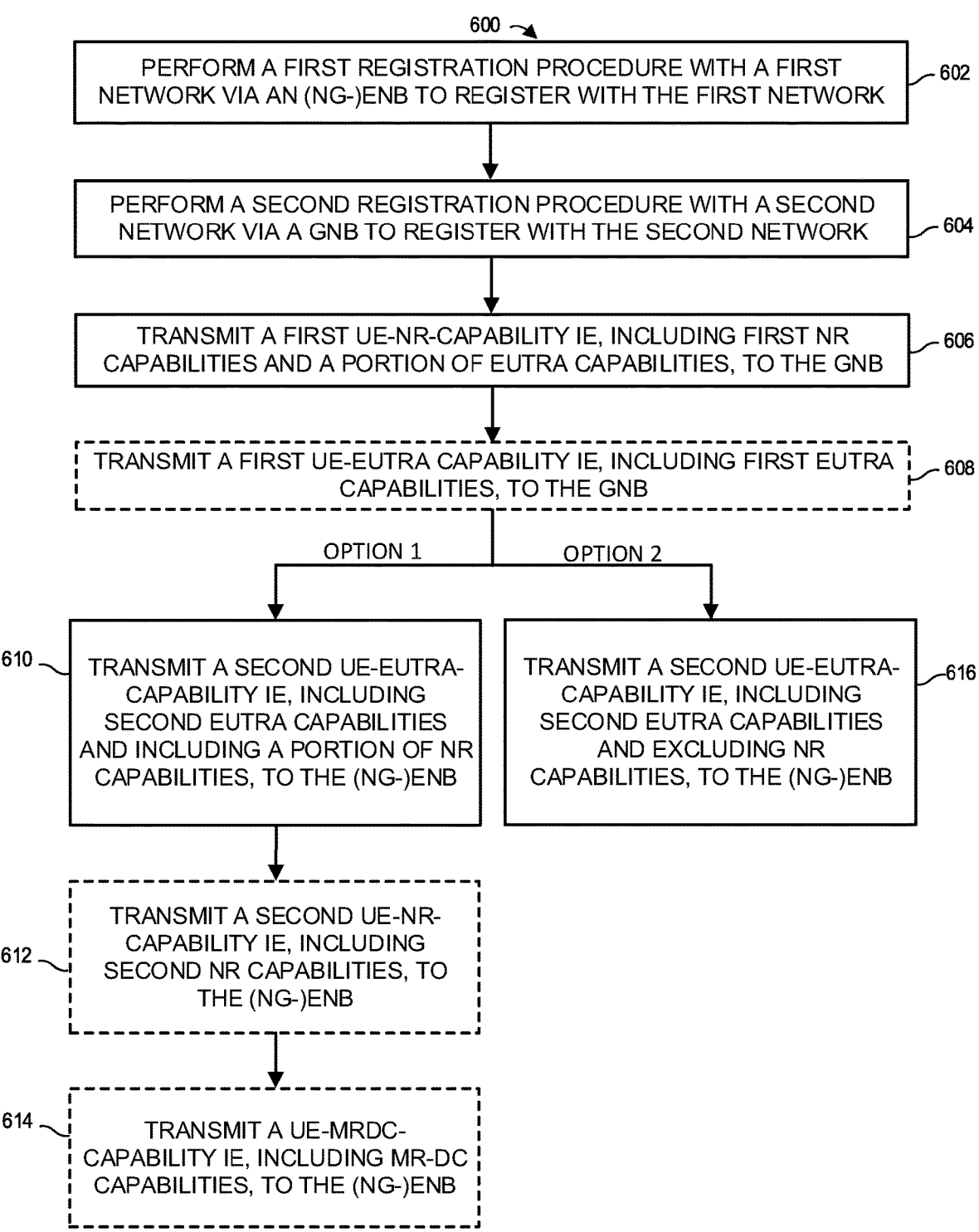
FIG. 6 is a flow diagram of an example method for providing UE capability information to a first network via a Universal Mobile Telecommunications System Terrestrial Radio Access (EUTRA) base station and to a second network via a new radio (NR) base station, which can be implemented by a UE.

FIG. 6 is a flow diagram of an example method 600 for providing UE capability information to a first network via a EUTRA base station and to a second network via an NR base station, which can be implemented by a UE (e.g., the UE 102). At block 602, the UE performs a first registration procedure with a first network (e.g., the CN 110A, which can be the CN 110A-1 or the CN 110A-2) via an (ng-)eNB (e.g., the base station 104A or 106A of the RAN 105A) to register with the first network (e.g., event 302). At block 604, the UE performs a second registration procedure with a second network (e.g., the CN 110B-2) via a gNB (e.g., the base station 104B or 106B of the RAN 105B) to register with the second network (e.g., event 324). In some implementations, the UE 102 registers with the second network at block 604 while already registered with the first network (i.e., block 604 occurs after block 602). In other implementations, the UE registers with the first network at block 602 while already registered with the second network (i.e., block 602 occurs after block 604).

At block 606, the UE transmits a first UE-NR-Capability IE to the gNB (e.g., event 328). The first UE-NR-Capability IE includes both first NR capabilities and a portion of EUTRA capabilities. In some implementations, at block 608, the UE also transmits a first UE-EUTRA-Capability IE, including first EUTRA capabilities, to the gNB (e.g., event 334). For example, based on the portion of EUTRA capabilities in the first UE-NR-Capability IE indicating that the UE supports EUTRA, the gNB can determine to request more detailed EUTRA capability information by transmitting a UECapabilityEnquiry message to the UE (e.g., event 332). In response, the UE transmits the first UE-EUTRA-Capability IE.

Depending on the implementation, the flow can proceed to either block 610 or block 616. If the flow proceeds to block 610, the UE transmits a second UE-EUTRA-Capability IE, including second EUTRA capabilities and a portion of NR capabilities, to the (ng-)eNB (e.g., event 306). In some implementations, at block 612, the UE transmits a second UE-NR-Capability IE, including second NR capabilities, to the (ng-)eNB (e.g., event 318). For example, based on the portion of NR capabilities in the second UE-EUTRA-Capability IE indicating the UE supports NR or (NG)EN-DC, the (ng-)eNB can determine to request more detailed NR capability information by transmitting a UECapabilityEnquiry message to the UE (e.g., event 316). In response, the UE transmits the second UE-NR-Capability IE. Further, in some implementations, at block 614, the UE transmits a UE-MRDC-Capability IE, including MR-DC capabilities, to the (ng-)eNB (e.g., event 312). For example, based on the portion of NR capabilities in the second UE-EUTRA-Capability IE indicating the UE supports MR-DC, the (ng-)eNB can determine to request more detailed MR-DC capability information by transmitting a UECapabilityEnquiry message to the UE (e.g., event 310). In response, the UE transmits the UE-MRDC-Capability IE.

If the flow instead proceeds to block 616, the UE transmits a second UE-EUTRA-Capability IE, including second EUTRA capabilities and excluding NR capabilities, to the (ng-)eNB (e.g., event 306). The UE may omit NR capabilities from the second UE-EUTRA-Capability IE if the UE does not support NR when communicating with the first network and/or if the UE does not support NR for both the first and second network when operating in a dual registration mode.

FIG. 7 is a flow diagram of an example method 700 for providing UE capability information to a first network via a first NR base station and to a second network via a second NR base station, which can be implemented by a UE (e.g., the UE 102). The method 700 is similar to the method 600, except that both base stations with which the UE communicates are NR base stations. At block 702, the UE performs a first registration procedure with a first network (e.g., the CN 110A-2) via a first gNB (e.g., the base station 104A or 106A of the RAN 105A) to register with the first network (e.g., event 424B). At block 704, the UE performs a second registration procedure with a second network (e.g., the CN 110B-2) via a second gNB (e.g., the base station 104B or 106B of the RAN 105B) to register with the second network (e.g., event 424A). In some implementations, the UE 102 registers with the second network at block 704 while already registered to the first network (i.e., block 704 occurs after block 702). In other implementations, the UE registers with the first network at block 702 while already being registered with the second network (i.e., block 702 occurs after block 704).

At block 706, the UE 102 transmits a first UE-NR-Capability IE to the first gNB (e.g., during the procedure 492). The first UE-NR-Capability IE includes both first NR capabilities and a portion of EUTRA capabilities. In some implementations, at block 708, the UE also transmits a first UE-EUTRA-Capability IE, including first EUTRA capabilities, to the first gNB (e.g., during the procedure 492). For example, based on the portion of EUTRA capabilities in the first UE-NR-Capability IE indicating that the UE supports EUTRA, the first gNB can determine to request more detailed EUTRA capability information by transmitting a UECapabilityEnquiry message to the UE (e.g., during the procedure 492). In response, the UE transmits the first UE-EUTRA-Capability IE.

Depending on the implementation, the flow can proceed to either block 710 or block 714. If the flow proceeds to block 710, the UE transmits a second UE-NR-Capability IE including second NR capabilities and a portion of EUTRA capabilities, to the second gNB (e.g., event 429). In some implementations, at block 712, the UE transmits a second UE-EUTRA-Capability IE, including second EUTRA capabilities, to the second gNB (e.g., event 434). For example, based on the portion of EUTRA capabilities in the second UE-NR-Capability IE indicating that the UE supports EUTRA, the second gNB can determine to request more detailed EUTRA capability information by transmitting a UECapabilityEnquiry message to the UE (e.g., event 432). In response, the UE transmits the second UE-EUTRA-Capability IE.

If the flow instead proceeds to block 714, the UE transmits a second UE-NR-Capability IE, including second NR capabilities and excluding EUTRA capabilities, to the second gNB (e.g., event 429). The UE may omit EUTRA capabilities from the second UE-NR-Capability IE if the UE does not support EUTRA when communicating with the second network and/or if the UE does not support EUTRA for both the first and second network when operating in a dual registration mode.

FIG. 8 is a flow diagram of an example method 800 for providing UE capability information to a first network via a first EUTRA base station and to a second network via a second EUTRA base station, which can be implemented by a UE (e.g., the UE 102). The method 800 is similar to the method 600, except that both base stations with which the UE communicates are EUTRA base stations. At block 802, the UE performs a first registration procedure with a first network (e.g., the CN 110A, which can be the CN 110A-1 or the CN 110A-2) via a first (ng-)eNB (e.g., the base station 104A or 106A of the RAN 105A) to register with the first network (e.g., event 502A). At block 804, the UE performs a second registration procedure with a second network (e.g., the CN 110B, which can be the CN 110B-1 or the CN 110B-2) via a second (ng-)eNB (e.g., the base station 104B or 106B of the RAN 105B) to register with the second network (e.g., event 502B). In some implementations, the UE 102 registers with the second network at block 804 while already registered with the first network (i.e., block 804 occurs after block 802). In other implementations, the UE registers with the first network at block 802 while already registered with the second network (i.e., block 802 occurs after block 804).

At block 806, the UE transmits a first UE-EUTRA-Capability IE to the first (ng-) eNB (e.g., during procedure 590A). The first UE-EUTRA-Capability IE includes both first EUTRA capabilities and a portion of NR capabilities. In some implementations, at block 808, the UE also transmits, to the first (ng-)eNB, a first UE-MRDC-Capability IE including first MR-DC capabilities and/or a first UE-NR-Capability IE including first NR capabilities (e.g., during procedure 590A). For example, based on the portion of NR capabilities in the first UE-EUTRA-Capability IE indicating that the UE supports MR-DC and/or standalone NR, the first (ng-)eNB can determine to request more detailed MR-DC and/or NR capability information by transmitting one or more UECapabilityEnquiry message(s) (e.g., a single message including an "eutra-nr" and an "nr" indication or two messages including an "eutra-nr" and an "nr" indication, respectively) to the UE. In response, the UE transmits the first UE-MRDC-Capability IE and/or the first UE-NR-Capability IE.

Depending on the implementation, the flow can proceed to either block 810 or block 816. If the flow proceeds to block 810, the UE transmits a second UE-EUTRA-Capability IE, including second EUTRA capabilities and a portion of NR capabilities, to the second (ng-)eNB (e.g., during procedure 590B). In some implementations, at block 812, the UE transmits a second UE-NR-Capability IE, including second NR capabilities, to the second (ng-)eNB (e.g., during procedure 590B). For example, based on the portion of NR capabilities in the second UE-EUTRA-Capability IE indicating the UE supports NR or (NG)EN-DC, the second (ng-)eNB can determine to request more detailed NR capability information by transmitting a UECapabilityEnquiry message to the UE. In response, the UE transmits the second UE-NR-Capability IE. Further, in some implementations, at block 814, the UE transmits a second UE-MRDC-Capability IE, including second MR-DC capabilities, to the second (ng-)eNB (e.g., during procedure 590B). For example, based on the portion of NR capabilities in the second UE-EUTRA-Capability IE indicating the UE supports MR-DC, the second (ng-)eNB can determine to request more detailed MR-DC capability information by transmitting a UECapabilityEnquiry message to the UE. In response, the UE transmits the second UE-MRDC-Capability IE.

If the flow instead proceeds to block 816, the UE transmits a second UE-EUTRA-Capability IE, including second EUTRA capabilities and excluding NR capabilities, to the second (ng-)eNB. The UE may omit NR capabilities from the second UE-EUTRA-Capability IE if the UE does not support NR when communicating with the second network and/or if the UE does not support NR for both the first and second network when operating in a dual registration mode.

Figure 9:
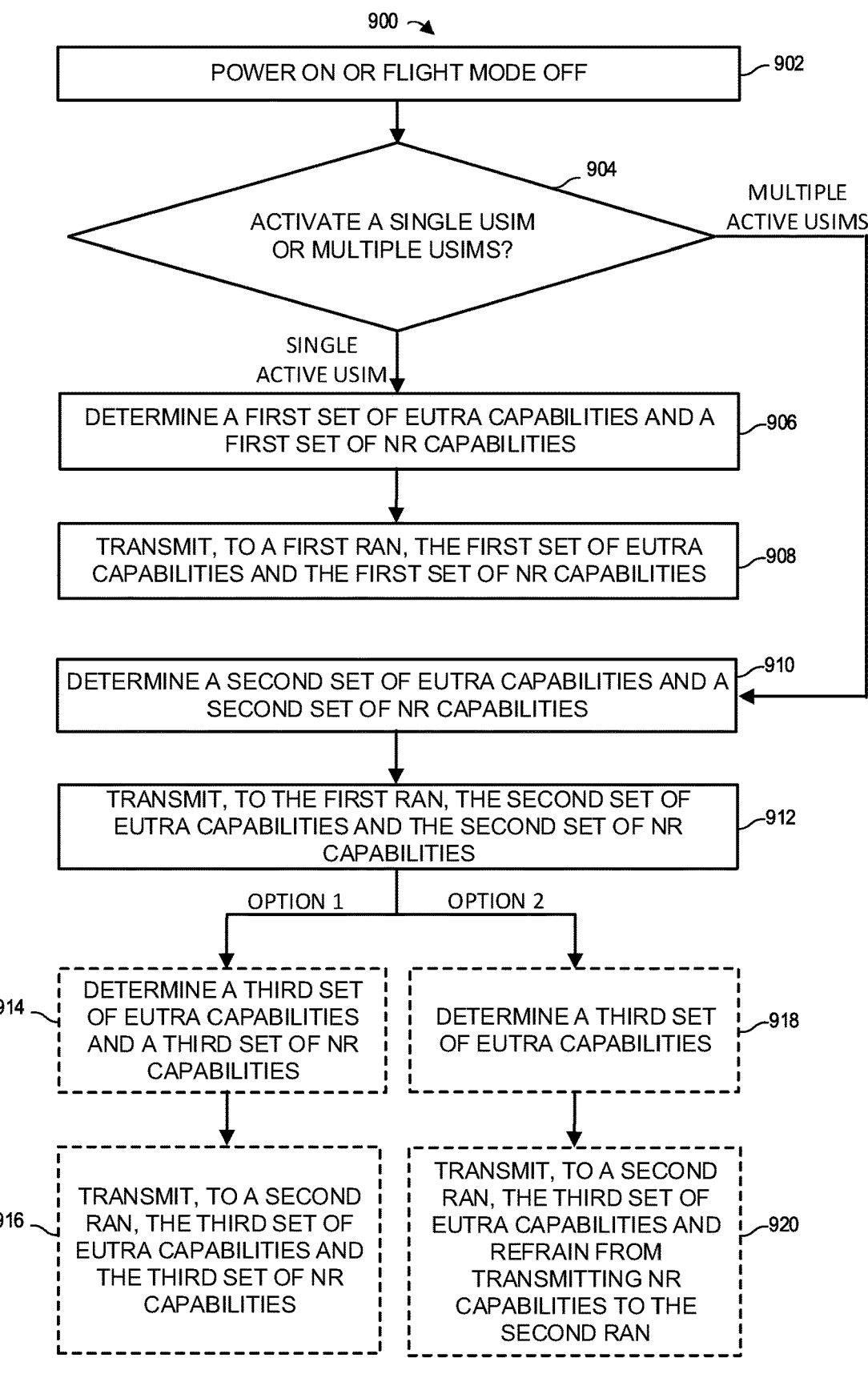
FIG. 9 is a flow diagram of an example method for managing UE capability information based on whether a UE has one or multiple Universal Subscriber Identity Modules (USIMs) activated, which can be implemented by the UE.

FIG. 9 is a flow diagram of an example method 900 for managing UE capability information based on whether a UE (e.g., the UE 102) has one or multiple USIMs activated, which can be implemented by the UE. At block 902, the UE powers on or detects that flight mode is off. Next, the UE at block 904 determines whether the UE has activated (or is attempting to activate, or expecting to activate within a predetermined time) a single USIM or multiple USIMs. If the UE has activated a single USIM, then the flow proceeds to block 906. At block 906, the UE determines a first set of EUTRA capabilities and a first set of NR capabilities. At block 908, the UE transmits, to a first RAN, the first set of EUTRA capabilities and the first set of NR capabilities.

If the UE has activated multiple USIMs, then the UE at block 910 determines a second set of EUTRA capabilities and a second set of NR capabilities. At block 912, the UE transmits, to the first RAN, the second set of EUTRA capabilities and the second set of NR capabilities. The UE capabilities for communicating with the first RAN may be different depending on whether the UE has activated a single USIM or multiple USIMS. Accordingly, at least a portion of the second set of EUTRA capabilities may be different from the first set of EUTRA capabilities, and at least a portion of the second set of NR capabilities may be different from the second set of EUTRA capabilities.

Depending on the implementation, the flow may proceed to either block 914 or block 918. At block 914, the UE determines a third set of EUTRA capabilities and a third set of NR capabilities, which may be different than the second set of EUTRA capabilities and the second set of NR capabilities. At block 916, the UE transmits the third set of EUTRA capabilities and the third set of NR capabilities to a second RAN. If the flow proceeds to block 918, the UE determines a third set of EUTRA capabilities. At block 920, the UE transmits the third set of EUTRA capabilities to the second RAN and refrains from transmitting NR capabilities to the second RAN. The UE may refrain from transmitting NR capabilities to the second RAN if the UE does not support NR when communicating with the second RAN and/or if the UE does not support NR for the second RAN when the UE has two USIMs activated.

FIG. 10 is a flow diagram of an example method 1000 for determining whether to enable or disable NR capabilities (e.g., capabilities dedicated to communicating over an NR RAT) based on whether a UE (e.g., the UE 102) has one or multiple USIMs activated, which can be implemented by the UE. At block 1002, the UE powers on or detects that flight mode is off. Next, the UE at block 1004 determines whether the UE has activated (or is attempting to activate, or expecting to activate within a predetermined time) a single USIM or multiple USIMs.

If the UE has activated a single USIM, then the flow proceeds to block 1006. At block 1006, the UE enables NR capabilities. At block 1008, the UE determines a first set of EUTRA capabilities and a first set of NR capabilities. The UE then transmits the first set of EUTRA capabilities and the first set of NR capabilities to a first RAN, at block 1010.

If the UE has activated multiple USIMs, then the flow proceeds to block 1012. At block 1012, the UE disables NR capabilities. For example, the UE may not support NR when operating with multiple active USIMs or operating in a dual registration mode (e.g., due to hardware limits of the UE). Accordingly, at block 1014, the UE only determines a second set of EUTRA capabilities and does not determine NR capabilities. At block 1016, the UE transmits, to the first RAN, the second set of EUTRA capabilities. The second set of EUTRA capabilities may different from the first set of EUTRA capabilities because the UE may have different capabilities when operating with a single active USIM versus multiple active USIMs. In some implementations, the UE also determines a third set of EUTRA capabilities at block 1018 and transmits, to a second RAN, the third set of EUTRA capabilities at block 1020.

FIG. 11A is a flow diagram of an example method 1100A for managing UE capability information based on whether an activated USIM of a UE (e.g., the UE 102) includes a particular home PLMN ID, which can be implemented by the UE. At block 1102, the UE activates multiple USIMs. The UE can use the multiple USIMs to register with multiple, respective networks. At block 1103, the UE determines whether one of the multiple USIMs includes a particular home PLMN ID. If yes, then the flow proceeds to block 1106.

At block 1106, the UE excludes at least one NR capability from a first set of NR capabilities. In some implementations, the at least one NR capability includes NR frequency band(s), NR band combination(s), and/or EUTRA-NR band combination(s). In other implementations, the at least one NR capability includes a particular multiple-input multiple-output (MIMO) layer and/or a particular sounding reference signal (SRS) antenna switch capability independent from an NR band, NR band combination, or EUTRA-NR band combination. In yet other implementations, the at least one NR capability includes a particular MIMO layer and/or a particular SRS antenna switch capability for a particular NR band, NR band combination, or EUTRA-NR band combination.

In some implementations, at block 1108, the UE also excludes at least one EUTRA capability from a first set of EUTRA capabilities. In some implementations, the at least one EUTRA capability includes EUTRA frequency band(s) and/or EUTRA band combination(s). In other implementations, the at least one EUTRA capability includes a particular MIMO layer and/or a particular SRS antenna switch capability independent from an EUTRA band or band combination. In yet other implementations, the at least one EUTRA capability includes a particular MIMO layer and/or a particular SRS antenna switch capability for a particular EUTRA band or band combination.

If none of the multiple USIMs includes the particular home PLMN ID, then the flow proceeds directly to block 1110, bypassing block 1106 and block 1108.

At block 1110, the UE transmits, to a first RAN, the first set of EUTRA capabilities and the first set of NR capabilities. Thus, if one of the multiple USIMs (e.g., the USIM that the UE uses to register to a first network via the first RAN), includes the particular home PLMN ID, the UE capabilities that the UE provides to the first RAN are different than if the multiple USIMs did not include the particular home PLMN ID. At block 1112, the UE also transmits, to a second RAN, a second set of EUTRA capabilities. If the UE supports NR when communicating with the second RAN while operating with multiple active USIMs or in a dual registration mode, then the UE may also transmit a second set of NR capabilities to the second RAN at block 1114.

Figure 11B:
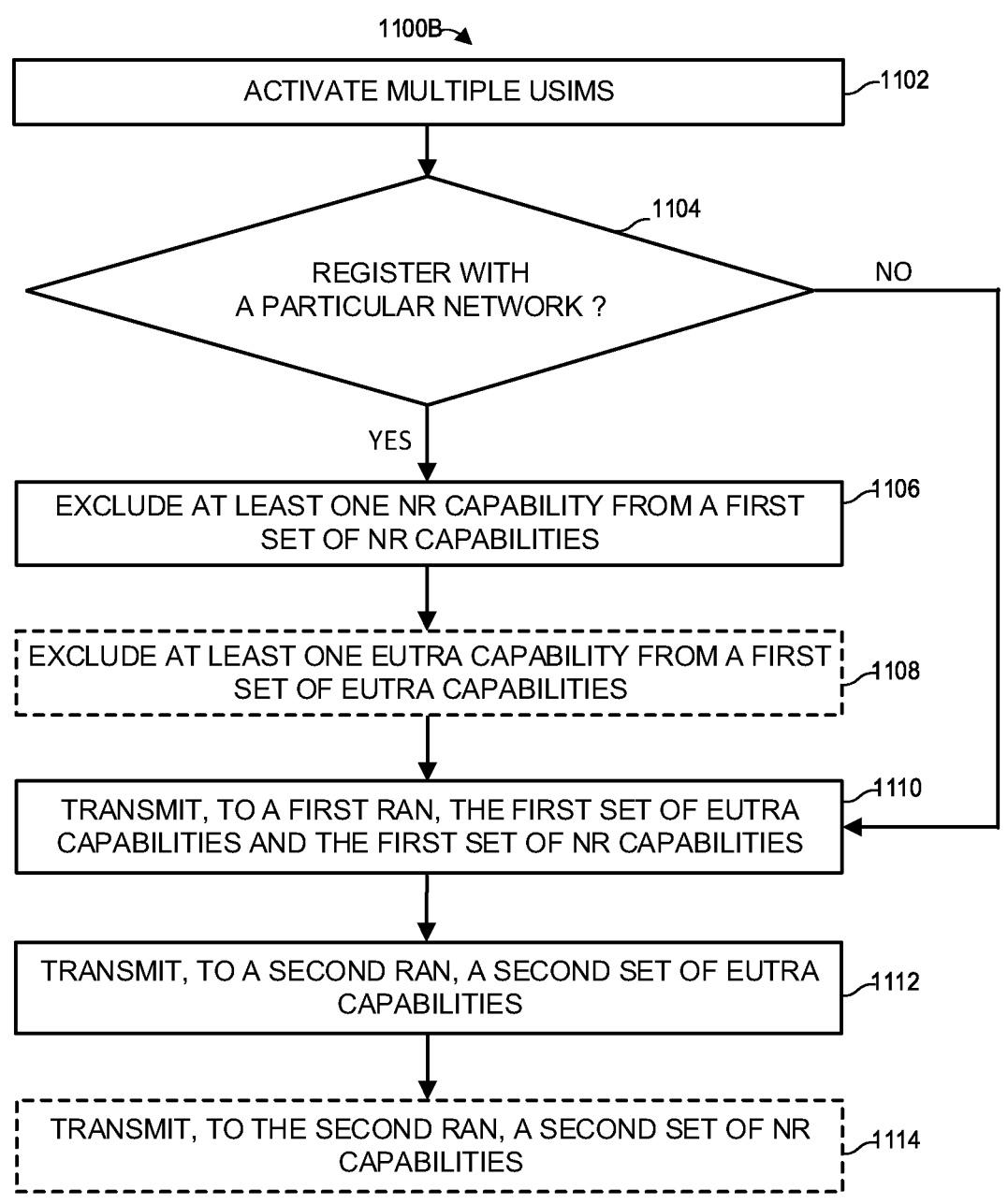
FIG. 11B is a flow diagram of an example method for managing UE capability information based on whether a UE is registered with a particular network, which can be implemented by the UE.

FIG. 11B is a flow diagram of an example method 1100B for managing UE capability information based on whether a UE (e.g., the UE 102) is registered with a particular network, which can be implemented by the UE. The method 1100B is generally similar to the method 1100A. In particular, blocks 1102, 1106, 1108, 1110, 1112, and 1114 of the method 1100A and 1100B are similar. However, at block 1104 of the method 1100B, the UE determines whether the UE is registered with a particular network. If yes, then the flow proceeds to block 1106. Otherwise, the flow proceeds directly to block 1110. Accordingly, the UE capabilities that the UE provides to the first RAN are different depending on whether the UE is registered to a particular network. The UE may be registered to the particular network via the first RAN.

FIG. 11C is a flow diagram of an example method for managing UE capability information based on whether a UE (e.g., the UE 102) is registered with a network belonging to a particular mobile country code, which can be implemented by the UE. The method 1100C is generally similar to the method 1100A. In particular, blocks 1102, 1106, 1108, 110, 112, and 1114 of the method 1100A and 1100C are similar. However, at block 1105 of the method 1100C, the UE determines whether the UE is registered with a network belonging to a particular mobile country code. If yes, then the flow proceeds to block 1106. Otherwise, the flow proceeds directly to block 1110. Accordingly, the UE capabilities that the UE provides to the first RAN are different depending on whether the UE is registered to a network belonging to a particular mobile country code. The UE may be registered to the network via the first RAN.

FIGS. 12-16 are flow diagram of example methods similar to the example methods of FIGS. 6-10, respectively, but where the UE can indicate UE capability information in a non-access stratum (NAS) message including a capability ID. A UE can implement the methods of FIGS. 12-16 if the UE supports RACS, as discussed above with reference to FIG. 1A.

Beginning with FIG. 12, a method 1200 is generally similar to the method 600. Accordingly, blocks 1202 and 1204 are similar to blocks 602 and 604, respectively. In the method 1200, the UE and at least the second network support RACS. At block 1206, instead of transmitting a UE-NR-Capability IE, the UE transmits a first NAS message, including a first capability ID indicating first NR capabilities and first EUTRA capabilities, to the second network via the gNB.

The flow can then proceed to either block 1208, 1210, 1212, or 1214. If the first network does not support RACS, then the flow can proceed to block 1208 or block 1210, in which the UE transmits UE capability IEs to report UE capabilities to the first network. In particular, at block 1208, the UE can perform the actions discussed above with reference to blocks 610, 612, and 614. At block 1210, the UE can perform the actions discussed above with reference to block 616.

If the first network supports RACS, then the flow can proceed to block 1212 or block 1214, in which the UE transmits NAS messages to report UE capabilities to the first network. At block 1212, the UE transmits a second NAS message, including a second capability ID indicating second EUTRA capabilities and second NR capabilities, to the first network via the (ng-)eNB. Otherwise, at block 1214, the UE transmits a second NAS message including a third capability ID indicating second EUTRA capabilities and not indicating NR capabilities, to the first network via the (ng-)eNB.

Turning to FIG. 13, a method 1300 is generally similar to the method 700. Accordingly, blocks 1302 and 1304 are similar to blocks 702 and 704, respectively. In the method 1300, the UE and at least the first network support RACS. At block 1306, instead of transmitting a UR-NR-Capability IE, the UE transmits a first NAS message, including a first capability ID indicating first NR capabilities and first EUTRA capabilities, to the first network via the first gNB.

The flow can then proceed to either block 1308, 1310, 1312, or 1314. If the second network does not support RACS, then the flow can proceed to block 1308 or block 1310, in which the UE transmits UE capability IEs to report UE capabilities to the second network. In particular, at block 1308, the UE can perform the actions discussed above with reference to blocks 710 and 712. At block 1310, the UE can perform the actions discussed above with reference to block 714.

If the second network supports RACS, then the flow can proceed to block 1312 or block 1314, in which the UE transmits NAS messages to report UE capabilities to the second network. At block 1312, the UE transmits a second NAS message, including a second capability ID indicating second EUTRA capabilities and second NR capabilities, to the second network via the second gNB. Otherwise, at block 1314, the UE transmits a second NAS message, including a third capability ID indicating second NR capabilities and not indicating EUTRA capabilities, to the second network via the second gNB.

Figure 14:
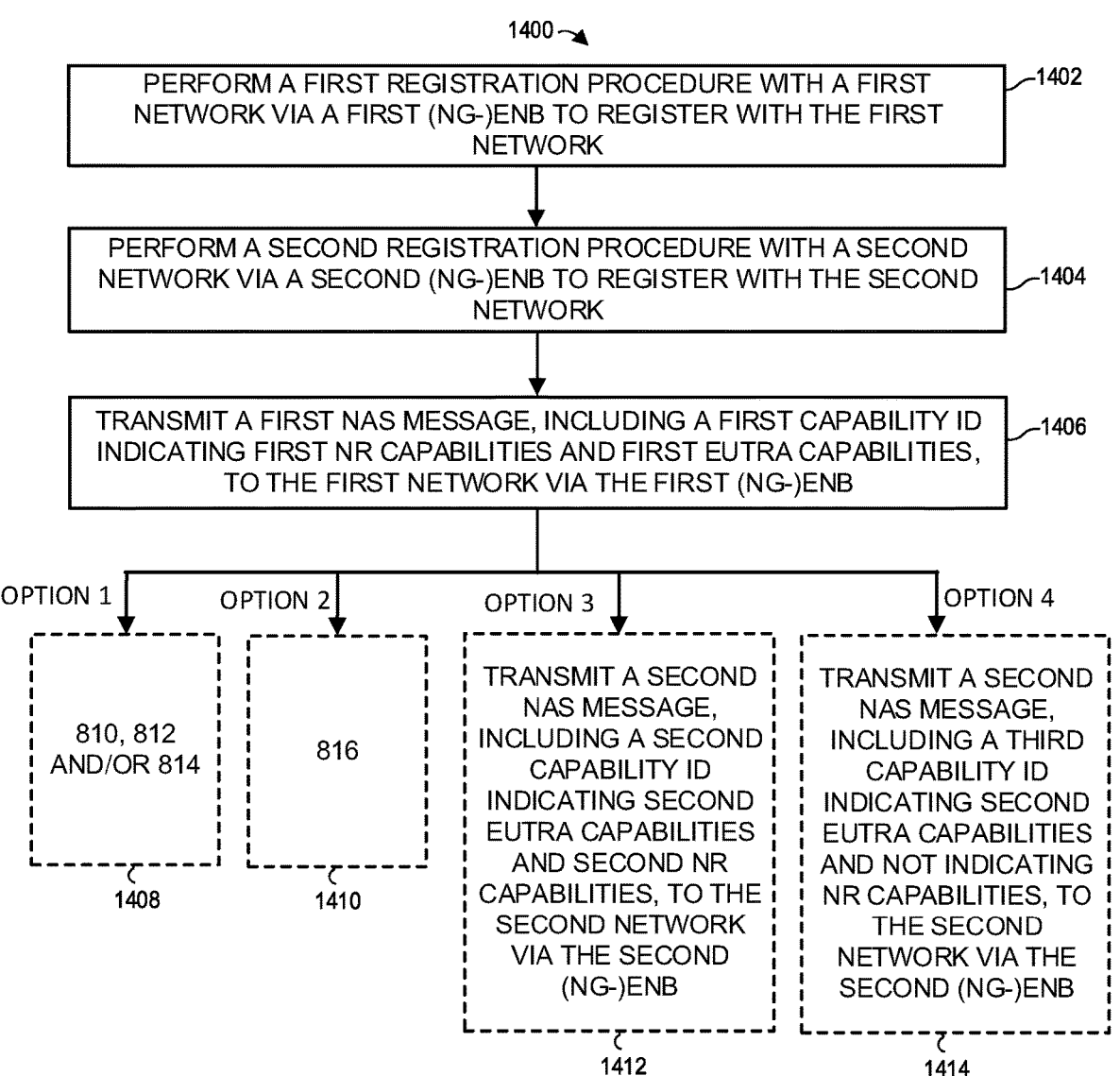

Turning to FIG. 14, a method 1400 is generally similar to the method 800. Accordingly, blocks 1402 and 1404 are similar to blocks 802 and 804, respectively. In the method 1400, the UE and at least the first network support RACS. At block 1406, instead of transmitting a UR-EUTRA-Capability IE, the UE transmits a first NAS message, including a first capability ID indicating first NR capabilities and first EUTRA capabilities, to the first network via the first (ng-)eNB.

The flow can then proceed to either block 1408, 1410, 1412, or 1414. If the second network does not support RACS, then the flow can proceed to block 1408 or block 1410, in which the UE transmits UE capability IEs to report UE capabilities to the second network. In particular, at block 1408, the UE can perform the actions discussed above with reference to blocks 810, 812, and 814. At block 1410, the UE can perform the actions discussed above with reference to block 816.

If the second network supports RACS, then the flow can proceed to block 1412 or block 1414, in which the UE transmits NAS messages to report UE capabilities to the second network. At block 1412, the UE transmits a second NAS message, including a second capability ID indicating second EUTRA capabilities and second NR capabilities, to the second network via the second (ng-)eNB. Otherwise, at block 1414, the UE transmits a second NAS message, including a third capability ID indicating second EUTRA capabilities and not indicating NR capabilities, to the second network via the second (ng-)eNB.

Figure 15:
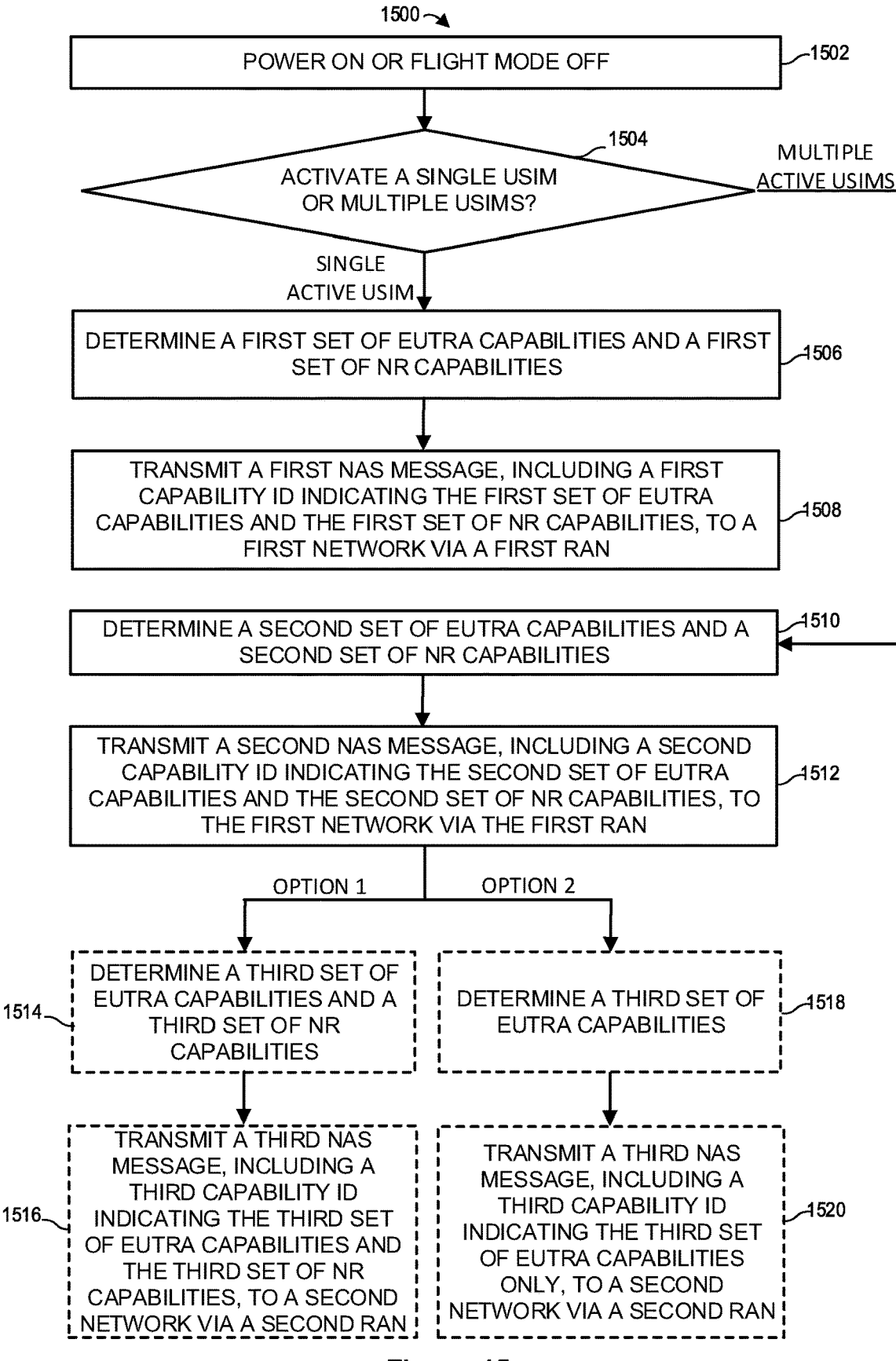

Next, FIG. 15 is a flow diagram of an example method 1500, which is generally similar to the method 900, except that the UE reports UE capabilities using NAS messages. Accordingly, blocks 1502, 1504, 1506, 1510, 1514, and 1518 are similar to blocks 902, 904, 906, 910, 914, and 918, respectively. At blocks 1508, 1512, 1516, and 1520, the UE transmits a NAS message including a capability ID that indicates the UE capabilities. In particular, at block 1508, the UE transmits a first NAS message, including a first capability ID indicating the first set of EUTRA capabilities and the first set of NR capabilities, to a first network via a first RAN. At block 1512, the UE transmits a second NAS message, including a second capability ID indicating the second set of EUTRA capabilities and the second set of NR capabilities, to the first network via the first RAN. If the flow proceeds to blocks 1514 and 1516, at block 1516, the UE transmits a third NAS message, including a third capability ID indicating the third set of EUTRA capabilities and the third set of NR capabilities, to a second network via a second RAN. If the flow proceeds to blocks 1518 and 1520, at block 1520, the UE transmits a third NAS message, including a third capability ID indicating the third set of EUTRA capabilities and not indicating NR capabilities, to the second network via the second RAN.

Next, FIG. 16 is a flow diagram of an example method 1600, which is generally similar to the method 1000, except that the UE reports UE capabilities using NAS messages. Accordingly, blocks 1602, 1604, 1606, 1608, 1612, 1614, and 1618 are similar to blocks 1002, 1004, 1006, 1008, 1012, 1014, and 1018, respectively. At blocks 1610, 1616, and 1620, the UE transmits a NAS message including a capability ID that indicates the UE capabilities rather than transmitting an IE including the UE capabilities. In particular, at block 1610, the UE transmits a first NAS message, including a first capability ID indicating the first set of EUTRA capabilities and the first set of NR capabilities, to a first network via a first RAN. At block 1616, the UE transmits a second NAS message, including a second capability ID indicating the second set of EUTRA capabilities, to the first network via the first RAN. At block 1620, the UE transmits a third NAS message, including a third capability ID indicating the third set of EUTRA capabilities, to a second network via a second RAN.

FIG. 17 is a flow diagram of an example method 1700 for managing UE capability information, which can be implemented by a UE (e.g., the UE 102) of FIG. 1A. The UE can perform the method 1700 using processing hardware (e.g., the processing hardware 150). The UE is equipped with a first USIM for communicating with a first cellular network (e.g., a cellular network including the CN 110A (i.e., the CN 110A-1 or the CN 110A-2)) and a second USIM for communicating with a second cellular network (e.g., a cellular network including the CN 110B (i.e., the CN 110B-1 or the CN 110B-2)). The first cellular network includes a first RAN (e.g., the RAN 105A), and the second cellular network includes a second RAN (e.g., the RAN 105B). The first RAN may be more advanced than the second RAN, less advanced than the second RAN, or the same type of RAN as the second RAN (e.g., each of the first RAN and the second RAN may be an EUTRAN or an NG-RAN). At block 1702, the UE registers with the first cellular network via the first RAN using the first USIM (e.g., events 302, 424A, 502A). At block 1704, the UE registers with the second cellular network via the second RAN using the second USIM (e.g., events 324, 424B, 502B), so that the UE is registered to both the first cellular network and the second cellular network.

At block 1706, the UE transmits, to the first RAN, a first indication of a UE capability for communicating with the first RAN over a first RAT (e.g., a 4G RAT) (e.g., events 306, 328, 429, 492, 590A, 590B). At block 1708, the UE determines whether the UE supports communicating over a second RAT (e.g., a 5G RAT), which is different from the first RAT, while registered to both the first cellular network and the second cellular network. The second RAT may be a more advanced RAT than the first RAT. If the UE supports communicating over the second RAT while the UE is operating in a dual-registration mode, then at block 1710, the UE transmits, to the first RAN, a second indication of a UE capability for communicating with the first RAN over the second RAT (e.g., events 306, 328, 429, 492, 590A, 590B). Otherwise, at block 1712, the UE disables UE capabilities dedicated to communicating over the second RAT (e.g., block 1012).

The UE may transmit the first and second indications in a single message. In some implementations, the message includes an IE for reporting capabilities related to the second RAT (e.g., a UE-NR-Capability IE indicating NR capabilities and at least a portion of EUTRA capabilities, such as events 328, 429, 492), which the UE may transmit in response to a request from the first RAN to provide UE capability information related to communicating with the first RAN over the second RAT (e.g., a UECapabilityEnquiry message including an "nr" indication, such as events 326, 426, or 492). In other implementations, the message includes or an IE for reporting capabilities to the first RAT (e.g., a UE-EUTRA-Capability IE indicating EUTRA capabilities and at least a portion of NR capabilities, such as events 306, 590A, 590B), which the UE may transmit in response to a request from the first RAN to provide UE capability information related to communicating with the first RAN over the first RAN (e.g., a UECapabilityEnquiry message including a "eutra" indication, such as events 304, 590A, 590B).

The message can be a message formatted in accordance with a protocol for controlling radio resources (e.g., an RRC message), or can be a NAS message. If the message is a NAS message, the message can include a capability identifier that indicates the UE capability for communicating with the first RAN over the first RAT and the UE capability for communicating with the first RAN over the second RAT (e.g., during the methods discussed with reference to FIGS. 12-16).

The UE may identify which UE capabilities to report to the first cellular network based on a home PLMN identifier included in the first USIM, the first cellular network, and/or a mobile country code of the first cellular network. Accordingly, the UE may indicate different capabilities (i.e., different first RAT capabilities and/or different second RAT capabilities), depending on the home PLMN identifier, cellular network, and/or mobile country code the cellular network.

Further, the UE may also transmit an indication of UE capabilities (e.g., for communicating over the first RAT and/or the second RAT) to the second RAN. The UE capabilities for communicating with the second RAN may be different than the UE capabilities for communicating with the first RAN.

The following list of examples reflects a variety of the embodiments explicitly contemplated by the present disclosure:

Example 1. A method in a user equipment (UE) for managing UE capability information, the UE equipped with a first universal subscriber identity module (USIM) for communicating with a first cellular network and a second USIM for communicating with a second cellular network, the first cellular network including a first radio access network (RAN), and the second cellular network including a second RAN, the method comprising: registering, by processing hardware of the UE, with the first cellular network via the first RAN using the first USIM; registering, by the processing hardware, with the second cellular network via the second RAN using the second USIM, so that the UE is registered to both the first cellular network and the second cellular network; transmitting, by the processing hardware to the first RAN, a first indication of a UE capability for communicating with the first RAN over a first RAT; and based on whether the UE supports communicating over a second RAT, which is different from the first RAT, while registered to both the first cellular network and the second cellular network, either: (i) transmitting, by the processing hardware to the first RAN, a second indication of a UE capability for communicating with the first RAN over the second RAT; or (ii) disabling, by the processing hardware, UE capabilities dedicated to communicating over the second RAT.

Example 2. The method of example 1, wherein: the UE supports communicating over the second RAT while registered to both the first cellular network and the second cellular network; and the UE transmits the second indication.

Example 3. The method of example 2, wherein the UE transmits the first indication and the second indication in a single message.

Example 4. The method of example 3, wherein transmitting the single message includes: transmitting an information element for reporting capabilities related to the second RAT, the information element including the first indication and the second indication.

Example 5. The method of example 4, wherein transmitting the information element includes: transmitting the information element in response to a request from the first RAN to provide UE capability information related to communicating with the first RAN over the second RAT.

Example 6. The method of example 4 or 5, further comprising: receiving, by the processing hardware subsequently to transmitting the single message, a request from the first RAN for UE capability information related to communicating with the first RAN over the first RAT; and transmitting, by the processing hardware to the first RAN, a third indication of an additional UE capability for communicating with the first RAN over the first RAT.

Example 7. The method of any one of examples 4-6, wherein the first RAN is a more advanced RAN than the second RAN.

Example 8. The method of example 3, wherein transmitting the single message includes: transmitting an information element for reporting capabilities related to the first RAT, the information element including the first indication and the second indication.

Example 9. The method of example 8, wherein transmitting the information element includes: transmitting the information element in response to a request from the first RAN to provide UE capability information related to communicating with the first RAN over the first RAT.

Example 10. The method of example 8 or 9, further comprising: receiving, by the processing hardware subsequently to transmitting the single message, a request from the first RAN for UE capability information related to communicating with the first RAN over the second RAT; and transmitting, by the processing hardware to the first RAN, a third indication of an additional UE capability for communicating with the first RAN over the second RAT.

Example 11. The method of example any one of examples 8-10, wherein the first RAN is a less advanced RAN than the second RAN.

Example 12. The method of any one of examples 3-11, wherein transmitting the single message includes: transmitting a message formatted in accordance with a protocol for controlling radio resources.

Example 13. The method of any one of examples 3-11, wherein transmitting the single message includes: transmitting, to the first cellular network via the first RAN, a non-access stratum (NAS) message including a capability identifier that indicates the UE capability for communicating with the first RAN over the first RAT and the UE capability for communicating with the first RAN over the second RAT.

Example 14. The method of any one of examples 2-13, wherein transmitting the first indication and the second indication includes: based on a home public land public network (PLMN) identifier included in the first USIM, identifying the UE capability for communicating with the first RAN over the first RAT and the UE capability for communicating with the first RAN over the second RAT.

Example 15. The method of any one of examples 2-13, wherein transmitting the first indication and the second indication includes: based on the first cellular network, identifying the UE capability for communicating with the first RAN over the first RAT and the UE capability for communicating with the first RAN over the second RAT.

Example 16. The method of any one of examples 2-13 wherein transmitting the first indication and the second indication includes: based on a mobile country code of the first cellular network, identifying the UE capability for communicating with the first RAN over the first RAT and the UE capability for communicating with the first RAN over the second RAT.

Example 17. The method of any one of examples 2-16, further comprising: transmitting, by the processing hardware to the second RAN, an indication of a UE capability for communicating with the second RAN over at least one of the first RAT or the second RAT.

Example 18. The method of any one of examples 2-16, further comprising: transmitting, by the processing hardware to the second RAN, an indication of a UE capability for communicating with the second RAN over the first RAT and a UE capability for communicating with the second RAN over the second RAT.

Example 19. The method of example 18, wherein at least one of: the UE capability for communicating with the second RAN over the first RAT is different from the UE capability for communicating with the first RAN over the first RAT; or the UE capability for communicating with the second RAN over the second RAT is different from the UE capability for communicating with the first RAN over the second RAT.

Example 20. The method of example 1, wherein: the UE does not support communicating over the second RAT while registered to both the first cellular network and the second cellular network; and the UE disables the UE capabilities dedicated to communicating over the second RAT.

Example 21. The method of any one of the preceding examples, wherein the second RAT is a more advanced RAT than the first RAT.

Example 22. A user equipment (UE) including processing hardware and configured to implement a method according to any one of the preceding examples.

The following additional considerations apply to the foregoing discussion.

In some implementations, "message" is used and can be replaced by "information element (IE)". In some implementations, "IE" is used and can be replaced by "field."

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

What is claimed is:

1. A method in a user equipment (UE) for managing UE capability information, the UE equipped with a first universal subscriber identity module (USIM) for communicating with a first cellular network and a second USIM for communicating with a second cellular network, the first cellular network including a first radio access network (RAN) and a first core network (CN), and the second cellular network including a second RAN and a second CN different from the first CN, the method comprising:

registering, by the UE, with the first cellular network via the first RAN using the first USIM;

registering with the second cellular network via the second RAN using the second USIM, so that the UE is registered to both the first cellular network and the second cellular network;

transmitting, to the first RAN, a first indication of a UE capability for communicating with the first RAN over a first RAT; and based on whether the UE supports communicating over a second RAT, which is different from the first RAT, while registered to both the first cellular network and the second cellular network, either:

(i) transmitting, to the first RAN, a second indication of a UE capability for communicating over the second RAT; or (ii) disabling UE capabilities dedicated to communicating over the second RAT.

2. The method of claim 1, wherein:

the UE supports communicating over the second RAT while registered to both the first cellular network and the second cellular network; and the UE transmits the second indication.

3. The method of claim 2, wherein the UE transmits the first indication and the second indication in a single message.

4. The method of claim 3, wherein transmitting the single message includes:

transmitting an information element for reporting capabilities related to the second RAT, the information element including the first indication and the second indication.

5. The method of claim 4, wherein transmitting the information element includes:

transmitting the information element in response to a request from the first RAN to provide UE capability information related to communicating over the second RAT.

6. The method of claim 4, further comprising:

receiving, subsequently to transmitting the single message, a request from the first RAN for UE capability information related to communicating with the first RAN over the first RAT; and transmitting, to the first RAN, a third indication of an additional UE capability for communicating with the first RAN over the first RAT.

7. The method of claim 4, wherein the first RAN is a more advanced RAN than the second RAN.

8. The method of claim 3, wherein transmitting the single message includes:

transmitting an information element for reporting capabilities related to the first RAT, the information element including the first indication and the second indication.

9. The method of claim 8, wherein transmitting the information element includes:

transmitting the information element in response to a request from the first RAN to provide UE capability information related to communicating with the first RAN over the first RAT.

10. The method of claim 8, further comprising:

receiving, subsequently to transmitting the single message, a request from the first RAN for UE capability information related to communicating with the first RAN over the second RAT; and transmitting, to the first RAN, a third indication of an additional UE capability for communicating with the first RAN over the second RAT.

11. The method of claim 8, wherein the first RAN is a less advanced RAN than the second RAN.

12. The method of claim 3, wherein transmitting the single message includes at least one of:

transmitting a message formatted in accordance with a protocol for controlling radio resources; or transmitting, to the first cellular network via the first RAN, a non-access stratum (NAS) message including a capability identifier that indicates the UE capability for communicating with the first RAN over the first RAT and the UE capability for communicating with the first RAN over the second RAT.

13. The method of claim 2, wherein transmitting the first indication and the second indication includes:

based on at least one of (i) a home public land public network (PLMN) identifier included in the first USIM, (ii) the first cellular network, or (iii) a mobile country code of the first cellular network, identifying the UE capability for communicating with the first RAN over the first RAT and the UE capability for communicating with the first RAN over the second RAT.

14. The method of claim 2, further comprising:

transmitting, by the processing hardware to the second RAN, an indication of a UE capability for communicating with the second RAN over at least one of the first RAT or the second RAT.

15. The method of claim 2, further comprising:

transmitting, to the second RAN, an indication of a UE capability for communicating with the second RAN over the first RAT and a UE capability for communicating with the second RAN over the second RAT.

16. The method of claim 15, wherein at least one of:

the UE capability for communicating with the second RAN over the first RAT is different from the UE capability for communicating with the first RAN over the first RAT; or the UE capability for communicating with the second RAN over the second RAT is different from the UE capability for communicating with the first RAN over the second RAT.

17. The method of claim 1, wherein:

the UE does not support communicating over the second RAT while registered to both the first cellular network and the second cellular network; and the UE disables the UE capabilities dedicated to communicating over the second RAT.

18. The method of claim 1, wherein the second RAT is a more advanced RAT than the first RAT.

19. A user equipment (UE) comprising:

processing hardware;

a first universal subscriber identity module (USIM) for communicating with a first cellular network that includes a first radio access network (RAN) and a first core network (CN);

a second USIM for communicating with a second cellular network that includes a second RAN and a second CN different from the first CN;

the UE configured to manage UE capability information by:

registering with the first cellular network via the first RAN using the first USIM, registering with the second cellular network via the second RAN using the second USIM, so that the UE is registered to both the first cellular network and the second cellular network;

transmitting, to the first RAN, a first indication of a UE capability for communicating with the first RAN over a first RAT, and based on whether the UE supports communicating over a second RAT, which is different from the first RAT, while registered to both the first cellular network and the second cellular network, either:

(i) transmitting, to the first RAN, a second indication of a UE capability for communicating over the second RAT; or (ii) disabling UE capabilities dedicated to communicating over the second RAT.

20. The UE of claim 19, wherein:

the UE supports communicating over the second RAT while registered to both the first cellular network and the second cellular network; and the UE transmits the second indication.

\* \* \* \* \*